United States Patent
Holmes et al.

(10) Patent No.: US 10,933,539 B2
(45) Date of Patent: Mar. 2, 2021

(54) GRIPPING DEVICES AND METHODS FOR MAKING THE SAME

(71) Applicant: Trustees of Boston University, Boston, MA (US)

(72) Inventors: Douglas P. Holmes, Jamaica Plain, MA (US); Yi Yang, Boston, MA (US); Peter Zink, Boston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 16/880,303

(22) Filed: May 21, 2020

(65) Prior Publication Data

US 2020/0368922 A1 Nov. 26, 2020

Related U.S. Application Data

(60) Provisional application No. 62/850,715, filed on May 21, 2019.

(51) Int. Cl.
*B25J 15/12* (2006.01)
*B25J 15/08* (2006.01)

(52) U.S. Cl.
CPC .............. *B25J 15/12* (2013.01); *B25J 15/08* (2013.01)

(58) Field of Classification Search
CPC ........ B25J 15/08; B25J 15/12; B25J 15/0246; B25J 11/0045
USPC ....................... 294/99.1, 99.2, 196
See application file for complete search history.

(56) References Cited

U.S. PATENT DOCUMENTS

| | | | | |
|---|---|---|---|---|
| 3,610,670 A | * | 10/1971 | Keck | B65D 85/00 294/99.1 |
| 4,141,138 A | * | 2/1979 | Quick | H05K 13/0447 29/740 |
| 4,192,204 A | * | 3/1980 | Feldman | A61B 17/30 294/1.2 |
| 5,775,755 A | * | 7/1998 | Covert | B25J 15/0226 294/100 |
| 8,424,940 B2 | * | 4/2013 | Sarda | B65G 47/847 294/99.1 |
| 9,464,642 B2 | | 10/2016 | Ilievski | |
| 9,867,631 B2 | * | 1/2018 | Edmondson | A61B 17/29 |
| 9,975,251 B2 | | 5/2018 | Lessing | |
| 10,001,149 B2 | | 6/2018 | Galloway | |
| 10,046,462 B2 | | 8/2018 | Knopf | |

(Continued)

FOREIGN PATENT DOCUMENTS

WO 2018/175744 A1 9/2018

OTHER PUBLICATIONS

Feix, T. et al.; "The GRASP Taxonomy of Human grasp Types"; IEEE Transactions on Human-Machine Systems, vol. 46, No. 1, pp. 66-77; Feb. 2016 (12 pages).

(Continued)

*Primary Examiner* — Dean J Kramer
(74) *Attorney, Agent, or Firm* — Nixon Peabody LLP

(57) ABSTRACT

A device includes a plurality of slots arranged in a pattern, a plurality of hinge portions, a pair of opposing jaw portions, and a pair of opposing actuation tabs. The pair of opposing actuation tabs are configured to move in generally opposite directions from a first position towards a second position in response to an input to aid in causing the pair of opposing jaw portions to grip an object.

53 Claims, 18 Drawing Sheets

(56) References Cited

U.S. PATENT DOCUMENTS

| | | | |
|---|---|---|---|
| 2006/0043749 A1* | 3/2006 | Huang | B25J 15/12 |
| | | | 294/99.1 |
| 2015/0037873 A1 | 2/2015 | Adielsson | |
| 2016/0075036 A1 | 3/2016 | Lessing | |
| 2016/0136877 A1 | 5/2016 | Rogers | |
| 2016/0361821 A1 | 12/2016 | Lessing | |
| 2017/0182723 A1 | 6/2017 | Calisch | |

OTHER PUBLICATIONS

Fujii, J. et al.; "Limb-use by foraging marine turtles, an evolutionary perspective"; Peer J. 6:e4565; Mar. 28, 2018 (11 pages).

Marshall, C. D. et al.; "Orofacial morphology and feeding behavior of the dugong, Amazonian, West African and Antillean manatees (Mammalia:Sirenia): functional morphology of the muscular-vibrissal complex"; Journal of Zoology, 259, pp. 245-260; 2003 (16 pages).

Hocking, D. P. et al.; "Chew, shake, and tear: Prey processing in Australian sea lions (*Neophoca cinerea*)"; Marine Mammal Science, 33(2), pp. 541-557; Apr. 2017 (17 pages).

Laschi, C. et al.; "Soft robotics: Technologies and systems pushing the boundaries of robot abilities"; Science Robotics. 1, eaah3690; Dec. 6, 2016 (12 pages).

Shintake, J. et al.; "Soft Robotic Grippers"; Advanced Materials, 30, 1707035; 2018 (33 pages).

Li, S. et al.; "Fluid-driven origami-inspired artificial muscles"; Proceedings of the National Academy of Sciences, vol. 114, No. 50, pp. 13132-13137; Dec. 12, 2017 (6 pages).

Ilievski, F. et al.; "Soft Robotics for Chemists"; Angewandte Chemie International Edition, 50, pp. 1890-1895; 2011 (6 pages).

Behl, M. et al.; "Reversible Bidirectional Shape-Memory Polymers"; Advanced Materials, 25, pp. 4466-4469; 2013 (4 pages).

Z. Yan et al.; "Universal dependence of hydrogen oxidation and evolution reaction activity of platinum-group metals on pH and hydrogen binding energy"; Science Advances, 2:e1501602; Mar. 18, 2016 (9 pages).

Shian, S. et al.; "Dielectric Elastomer based 'Grippers' for Soft Robotics"; Advanced Materials, 27, pp. 6814-6819; 2015 (6 pages).

Abdullah, A. M. et al.; "Self-Folded Gripper-Like Architectures from Stimuli-Responsive Bilayers"; Advanced Materials, 30, 1801669; 2018 (9 pages).

Bassik, N. et al.; "Enzymatically Triggered Actuation of Miniaturized Tools"; J. Am. Chem. Soc., 132, pp. 16314-16317; 2010 (4 pages).

Wani, O. M. et al.; "A light-driven artificial flytrap"; Nature Communications, 8:15446; May 23, 2017 (7 pages).

Y. Liu et al.; "Sequential self-folding of polymer sheets"; Science Advances, 3:e1602417; Mar. 3, 2017 (8 pages).

Brown, E. et al.; "Universal robotic gripper based on the jamming of granular material"; Proceedings of the National Academy of Sciences, vol. 107, No. 44, pp. 18809-18814; Nov. 2, 2010 (6 pages).

Rafsanjani, A. et al.; "Kirigami skins make a simple soft actuator crawl"; Science Robotics, 3, eaar7555; Feb. 21, 2018 (8 pages).

Shyu, T. C. et al.; "A kirigami approach to engineering elasticity in nanocomposites through patterned defects"; Nature Materials, vol. 14, pp. 785-789; Jun. 22, 2015 (6 pages).

Lamoureux, A. et al.; "Dynamic kirigami structures for integrated solar tracking"; Nature Communications, 6, 8092; Sep. 8, 2015 (6 pages).

Y. Cho et al.; "Engineering the shape and structure of materials by fractal cut"; Proceedings of the National Academy of Sciences, vol. 111, No. 49, pp. 17390-17395; Dec. 9, 2014 (6 pages).

Dias, M. A. et al.; "Kirigami Actuators": Soft Matter, vol. 13, 9087; Oct. 7, 2017 (7 pages).

Y. Yang et al.; "Multistable Kirigami for Tunable Architected Materials"; Phys. Rev. Materials, 2, 110601; Nov. 20, 2018 (6 pages).

Rafsanjani, A. et al.; "Buckling-Induced Kirigami"; Phys. Rev. Lett., 118, 0843011-1-084301-5; Feb. 24, 2017 (5 pages).

International Search Report and Written Opinion in International Patent Application No. PCT/US2020/034014, dated Oct. 30, 2020 (13 pages).

* cited by examiner

GRIPPING DEVICES AND METHODS FOR MAKING THE SAME

CROSS-REFERENCE TO RELATED APPLICATIONS

This application claims the benefit of and priority to U.S. Provisional Application No. 62/850,715, filed on May 21, 2019, which is hereby incorporated by reference herein in its entirety.

TECHNICAL FIELD

The present disclosure relates generally to devices for gripping an object, and more particularly, griping devices including a pattern of slots, and methods for making and using the same.

BACKGROUND

Grasping or gripping objects having arbitrary shapes is useful in a variety of applications. Mechanical linkage-based robotic hands are often used as robotic gripping devices to grasp objects. These linkage-based hands are often based on the thumb-index grasping movement of a human hand. However, linkage-based gripping mechanisms are often complex and limited in bio-mimicking the grasping movement of a hand. The present disclosure is directed to addressing these and other problems.

SUMMARY

According to some implementations of the present disclosure, a device includes a plurality of slots arranged in a pattern, a plurality of hinge portions, a pair of opposing jaw portions. and a pair of opposing actuation tabs. The pair of opposing actuation tabs are configured to move in generally opposite directions from a first position towards a second position in response to an input to aid in causing the pair of opposing jaw portions to grip an object.

According to some implementations of the present disclosure, a method for making a gripping device includes positioning a substrate in a first cavity of a mold, the first cavity of the mold having a plurality of protrusions. The method also includes at least partially filling the first cavity of the mold with a material to form a composite including the substrate and the material with the substrate positioned in the first cavity. The method further includes removing the composite from the mold, the removed composite having a curvature and a plurality of slots corresponding to the plurality of protrusions of the first cavity of the mold.

According to some implementations of the present disclosure, a method for making a gripping device includes receiving a sheet having a curvature, forming a pattern of slots in the sheet, and cutting a gripping device from the sheet. The gripping device includes at least a portion of the pattern of slots formed in the sheet and a plurality of hinge portions, a pair of opposing jaw portions, and a pair of opposing actuation tabs. The pair of opposing actuation tabs are configured to move in generally opposite directions from a first position towards a second position in response to an input to aid in causing the pair of opposing jaw portions to grip an object.

According to some implementations of the present disclosure, a method for making a gripping device includes receiving a generally flat sheet and modifying the sheet such that the sheet is biased with a general curvature. The method also includes forming a pattern of slots in the sheet. The method further includes cutting a gripping device from the sheet such that the gripping device includes (i) at least a portion of the pattern of slots formed in the sheet and (ii) a plurality of hinge portions, a pair of opposing jaw portions, and a pair of opposing actuation tabs configured to move in generally opposite directions from a first position towards a second position in response to an input to aid in causing the pair of opposing jaw portions to grip an object.

The above summary is not intended to represent each embodiment or every aspect of the present invention. Additional features and benefits of the present invention are apparent from the detailed description and figures set forth below.

Figure 8B:
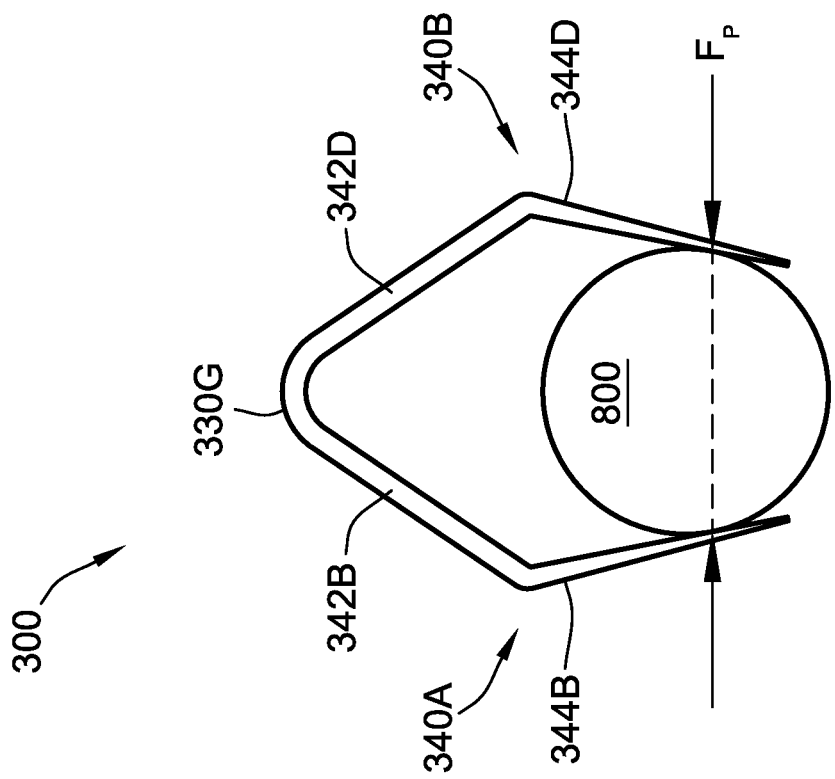
Figure 8A:
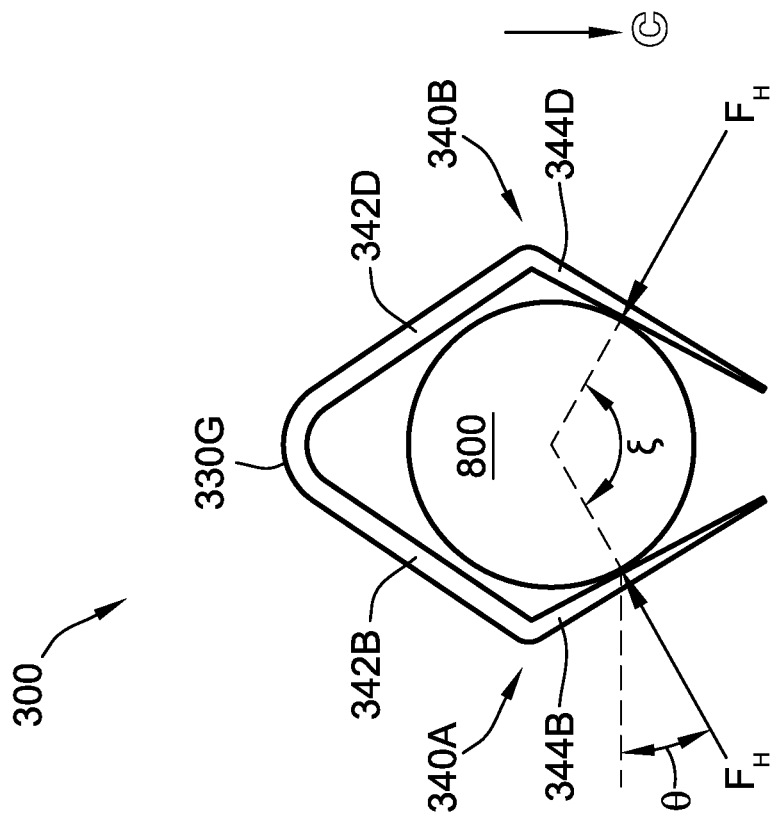
Figure 9A:
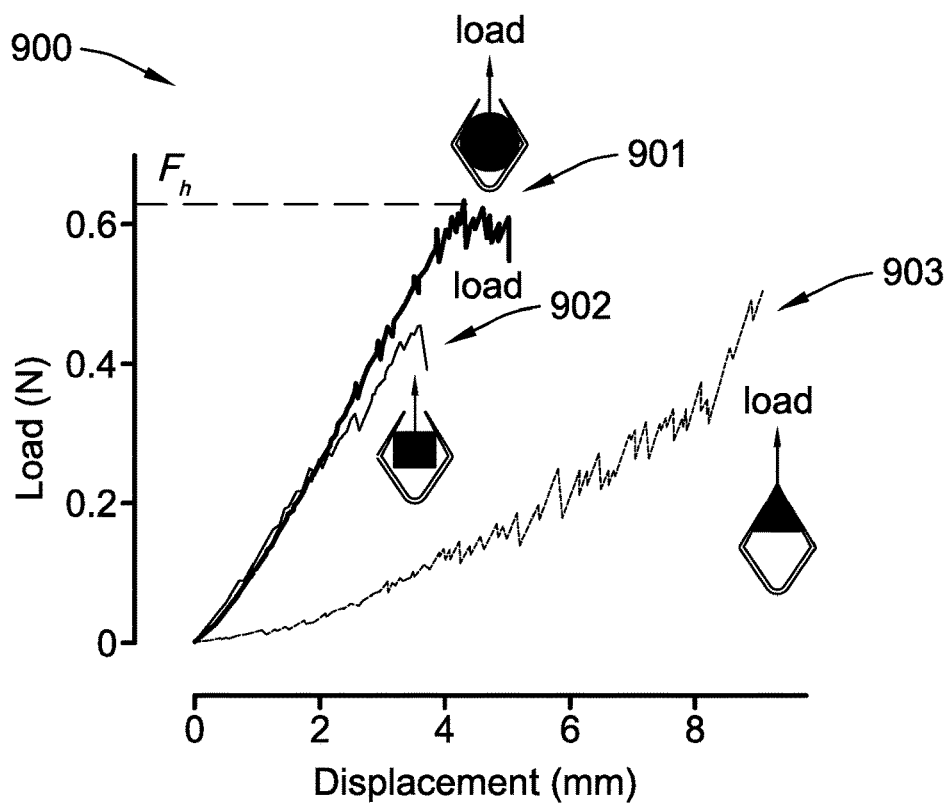
Figure 9B:
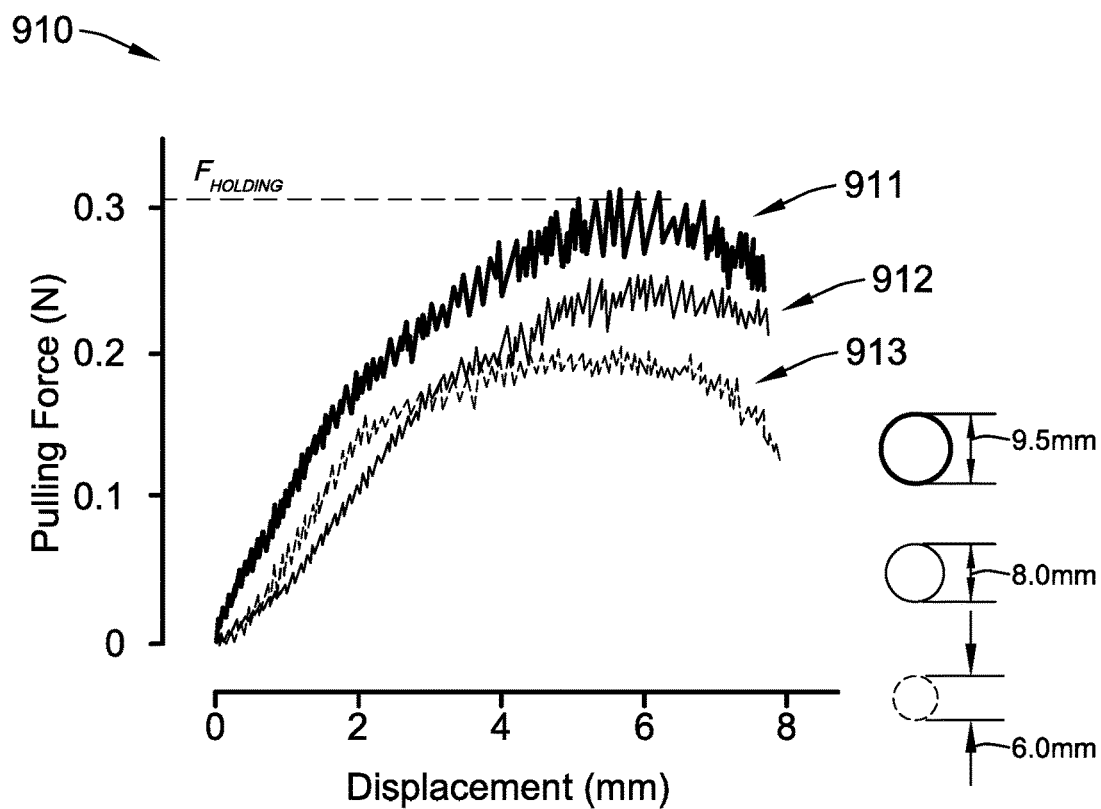
Figure 10:
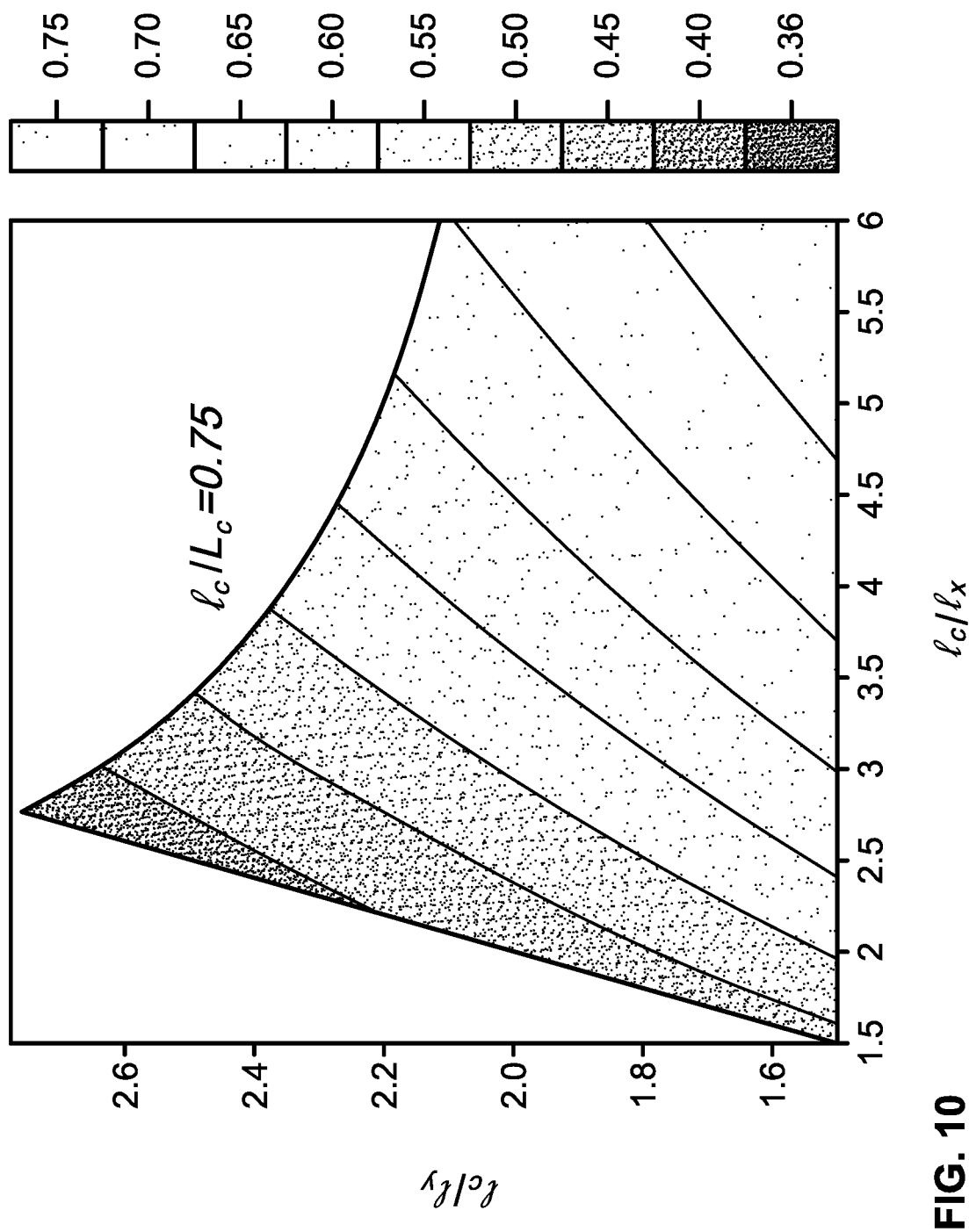
Figure 11A:
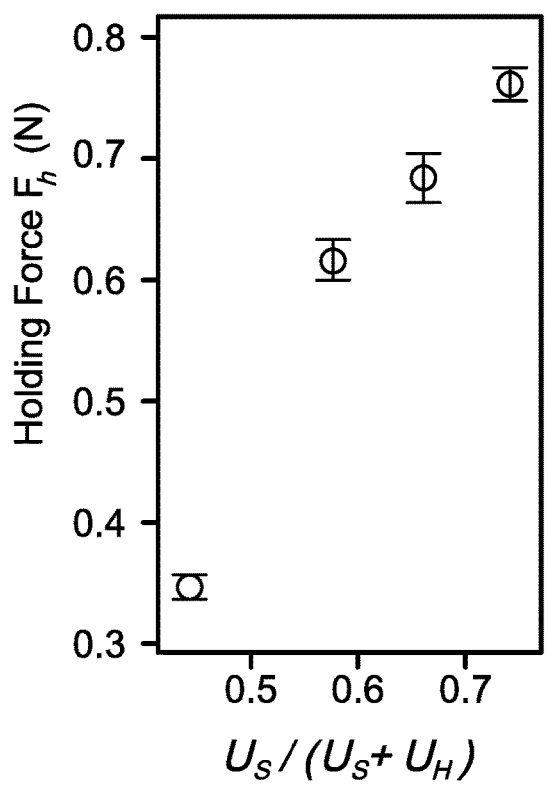
Figure 11B:
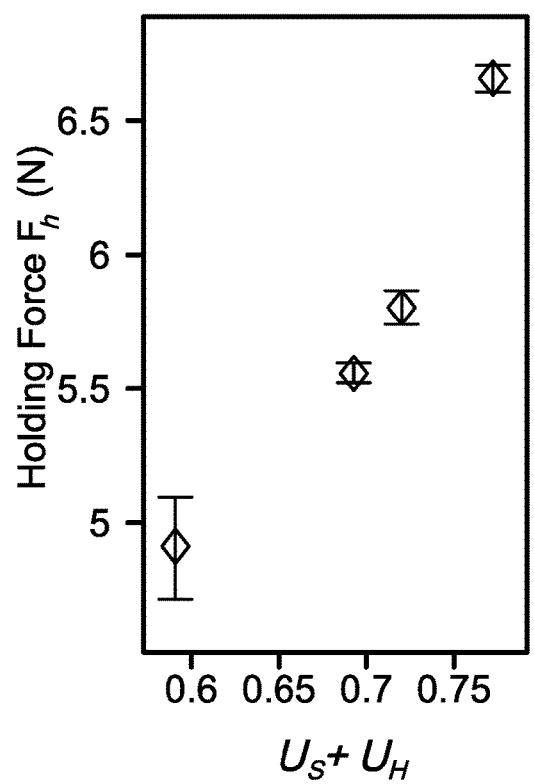
Figure 11C:
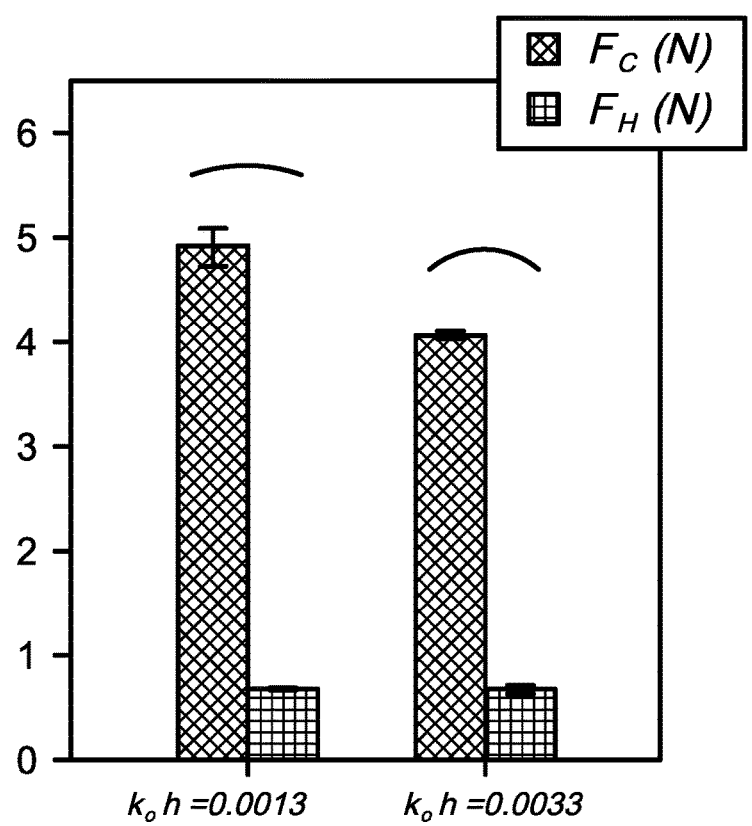
Figure 11D:
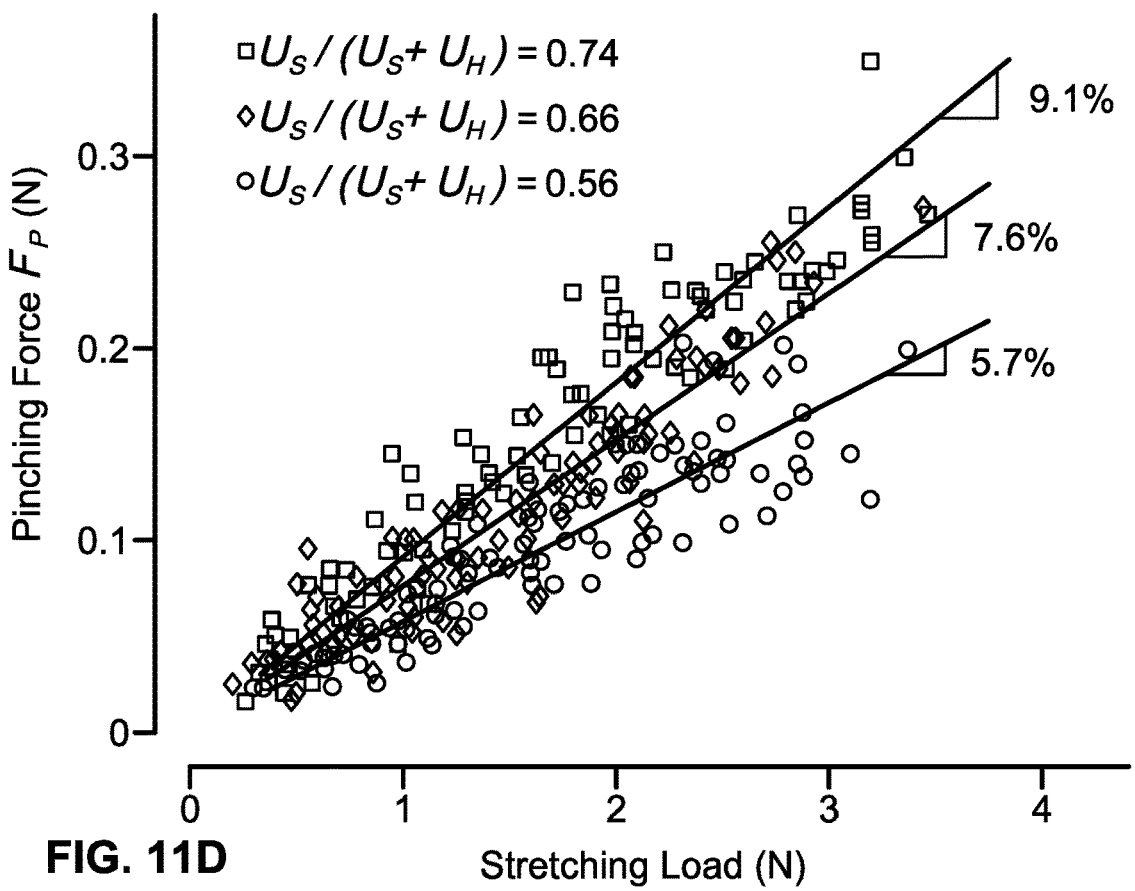
Figure 11E:
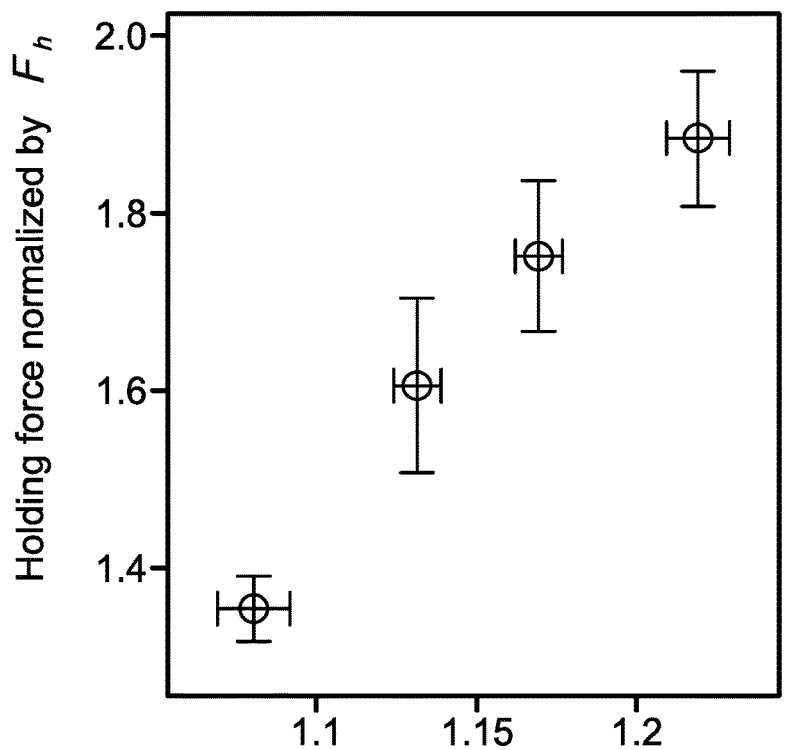
Figure 12A:
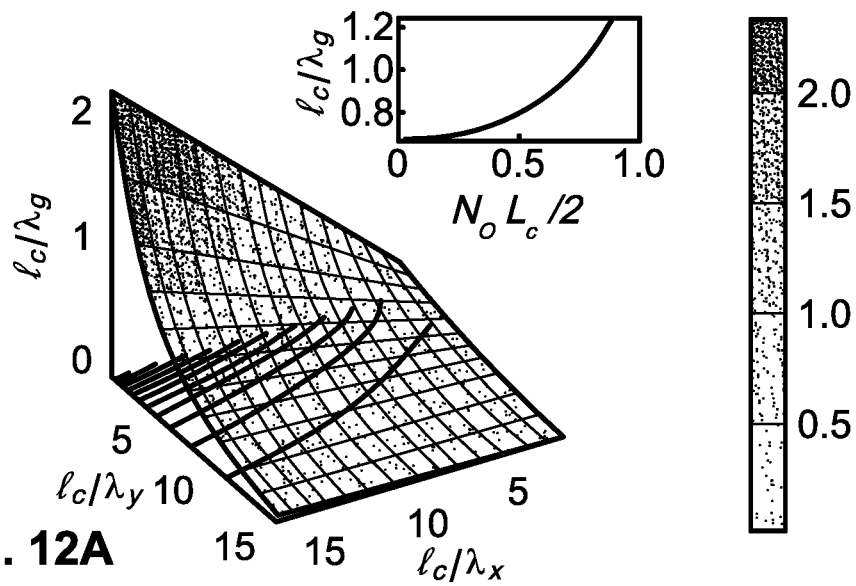
Figure 12B:
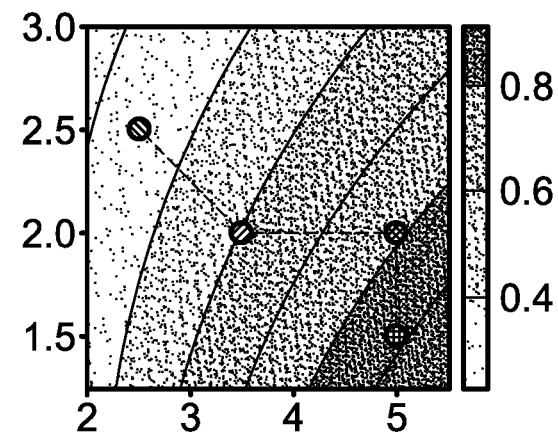
Figure 12C:
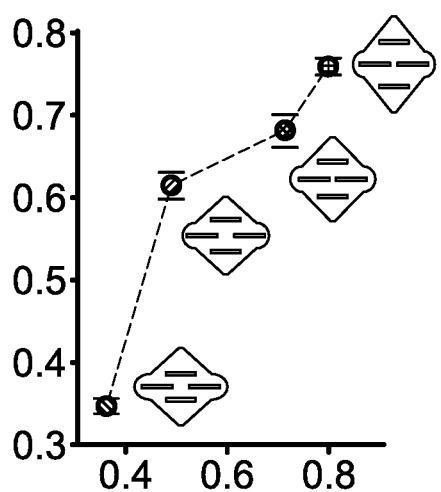
Figure 12D:
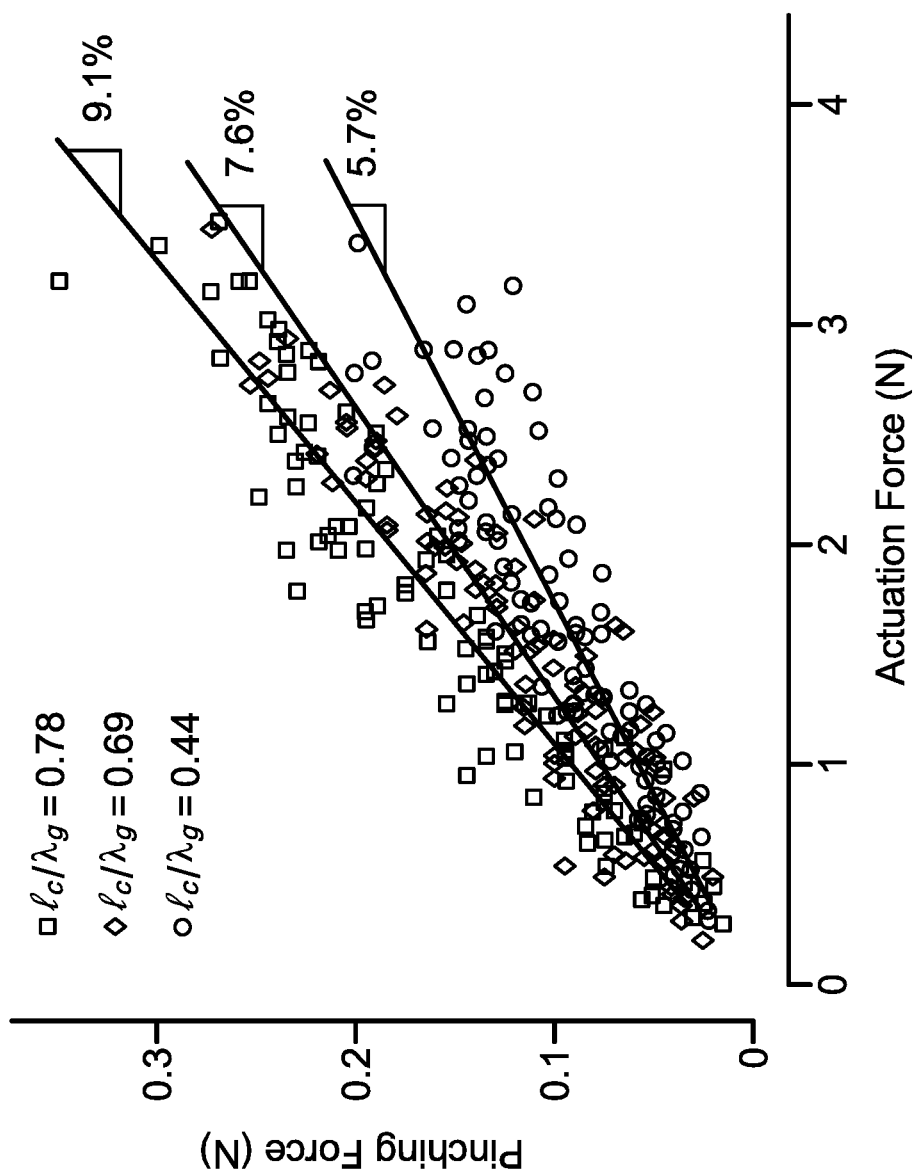
Figure 13:
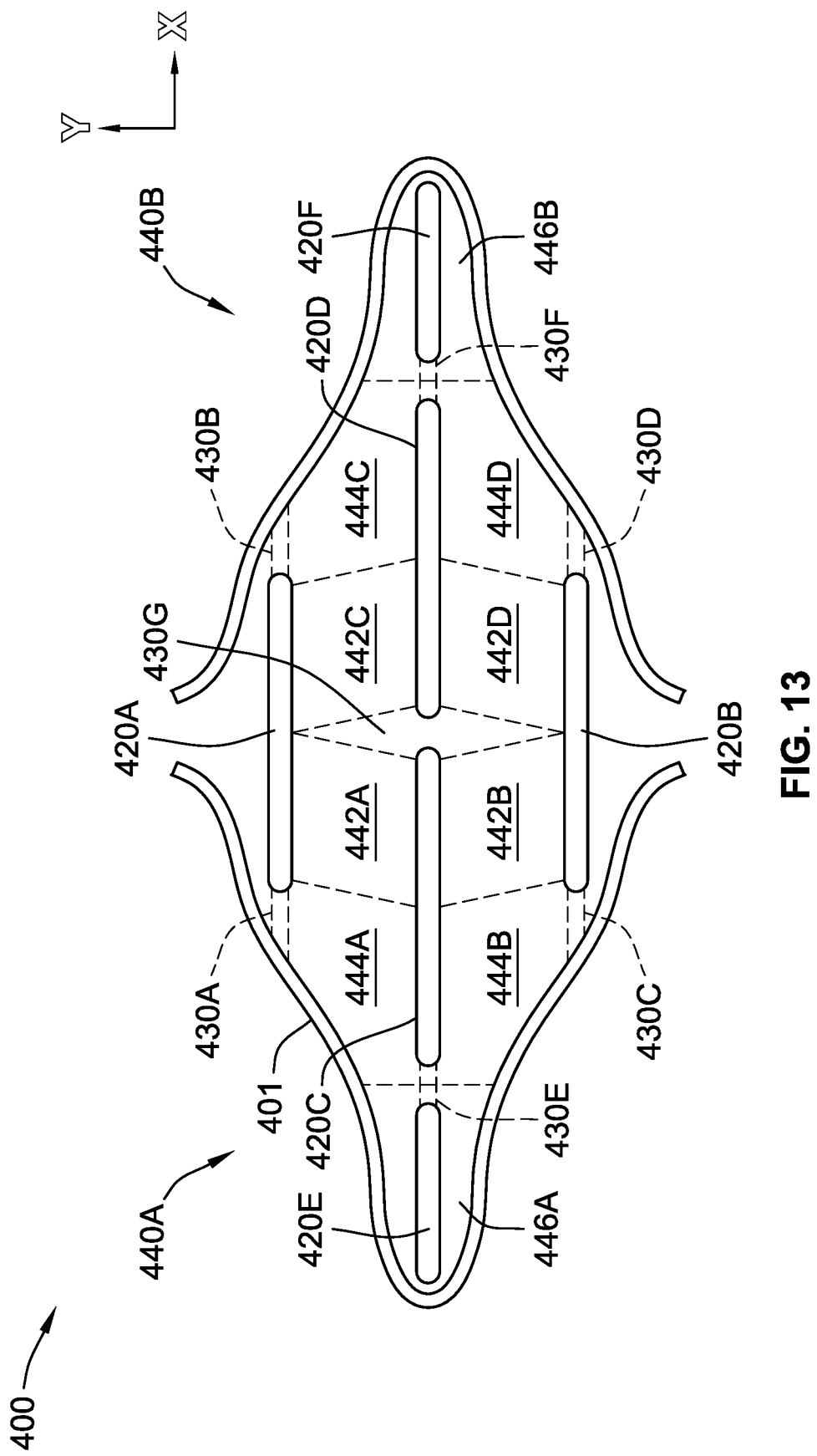
Figure 14:
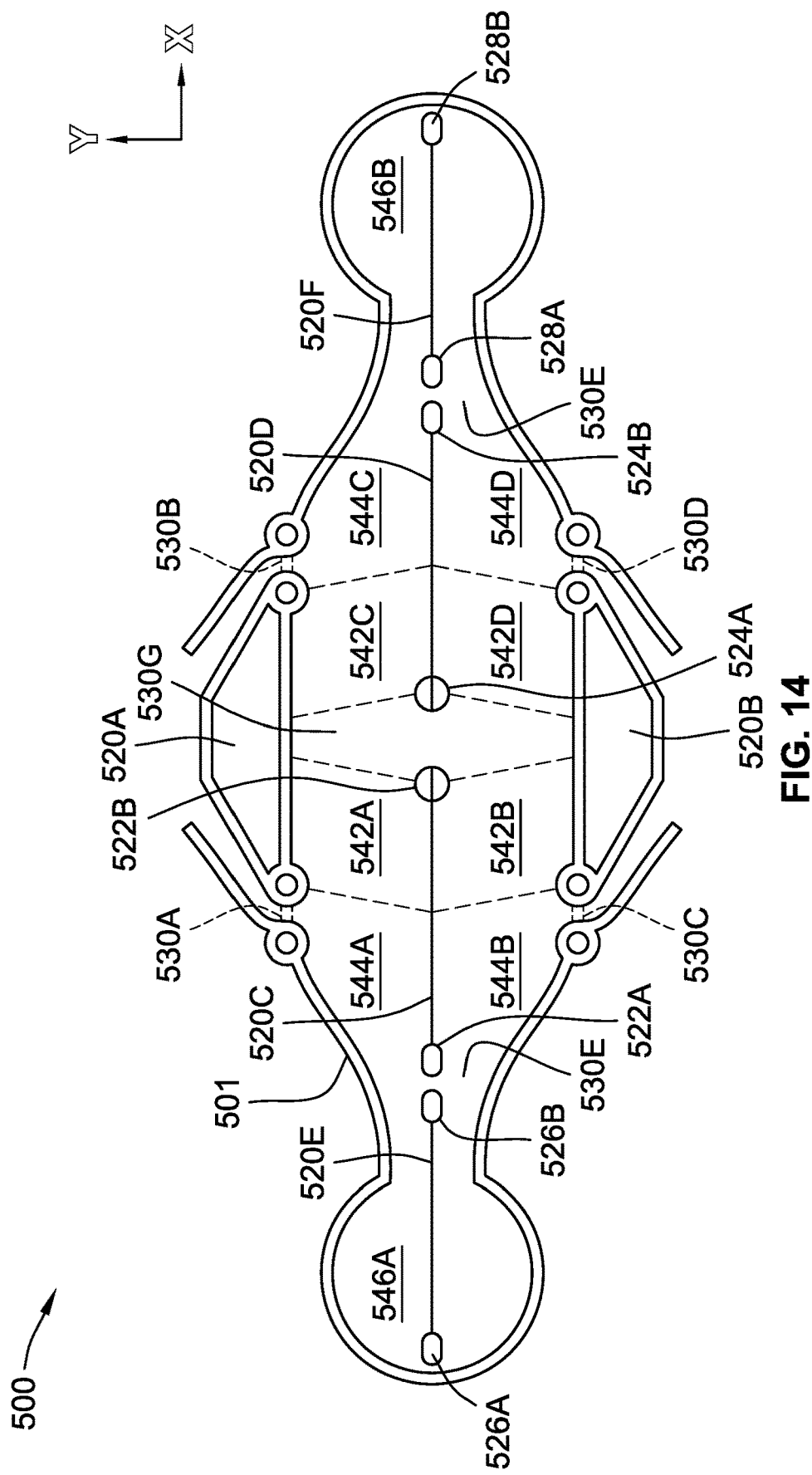
Figure 15A:
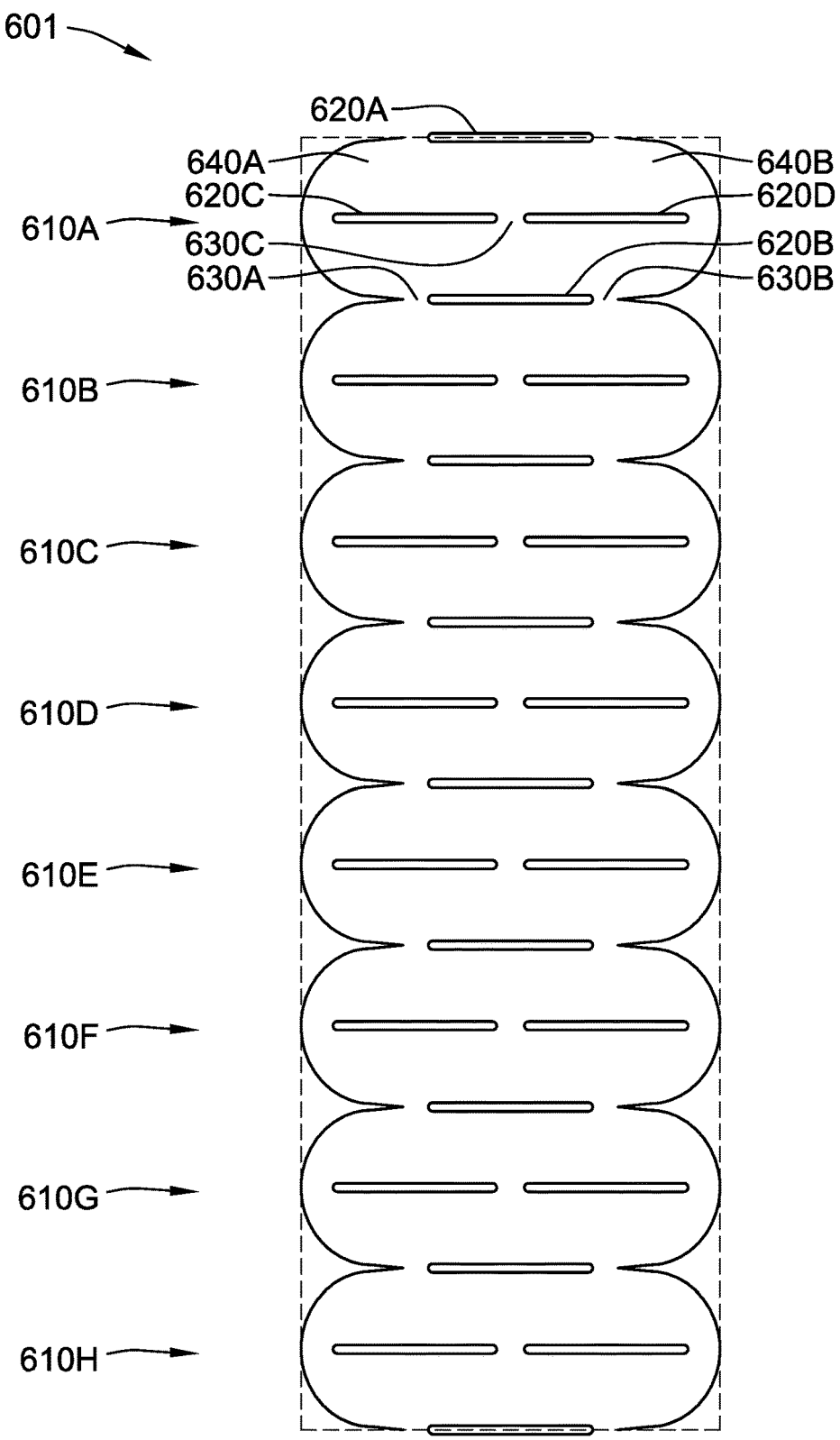
Figure 15B:
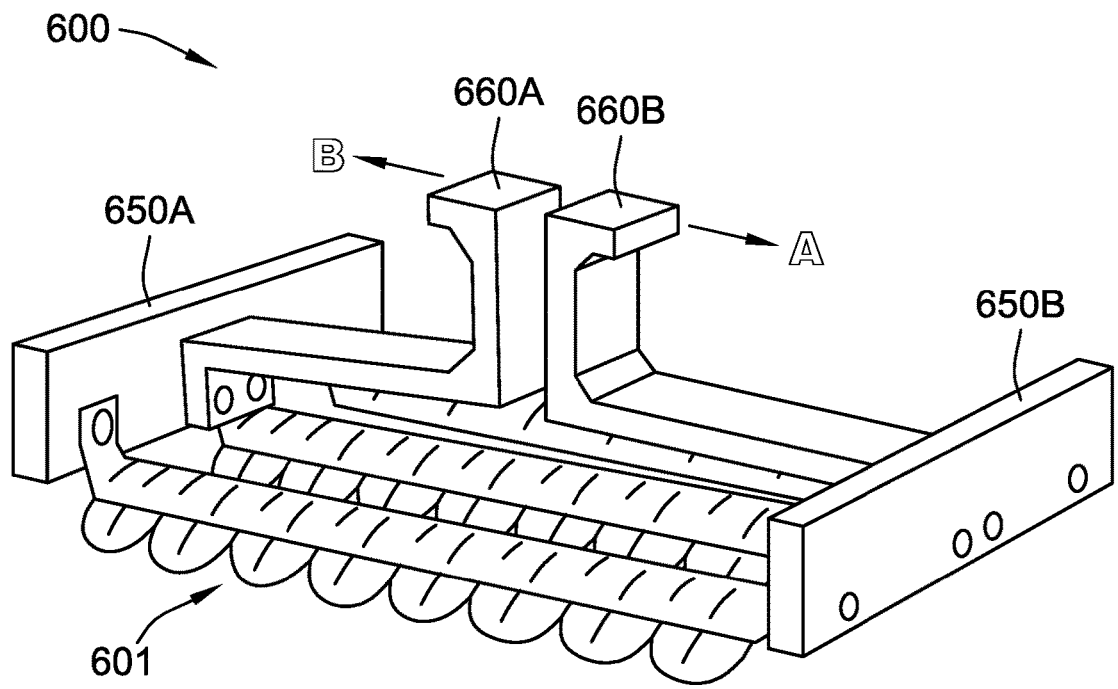
Figure 15C:
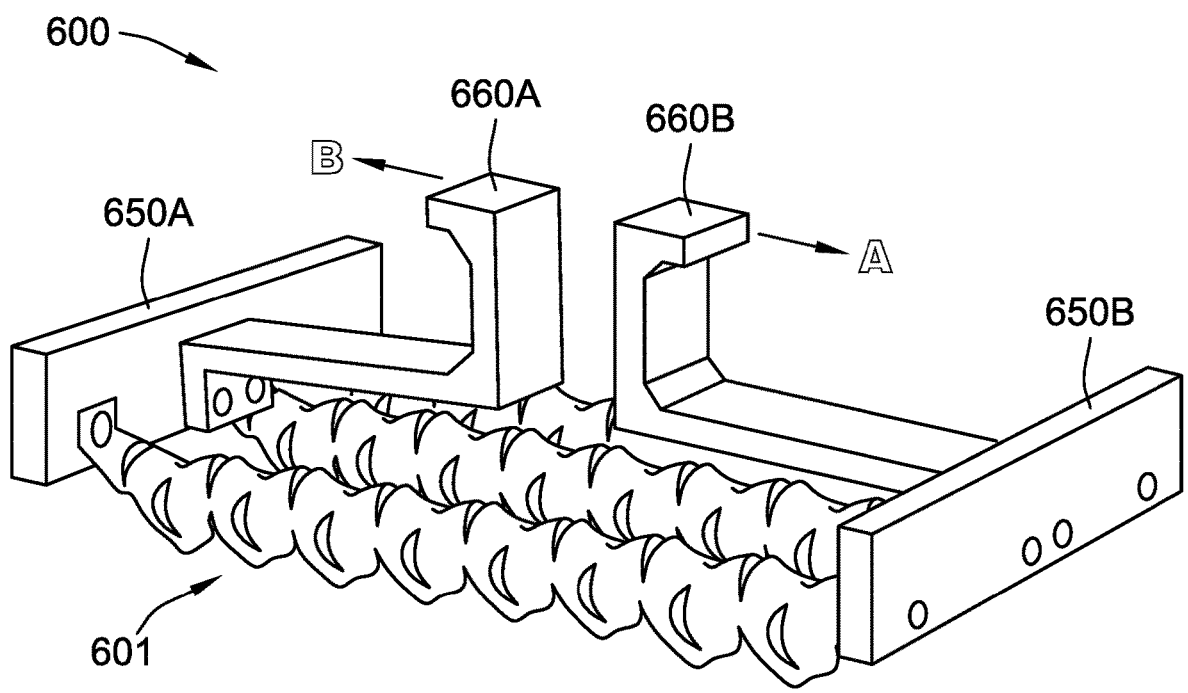

FIG. 8A is a free body diagram of a gripping device applying a holding force to an object, according to some implementations of the present disclosure;

FIG. 8B is a free body diagram of the gripping device applying a pinching force to the object of FIG. 8A, according to some implementations of the present disclosure;

FIG. 9A is a plot showing pulling force versus displacement for objects having different cross-sectional geometries, according to some implementations of the present disclosure;

FIG. 9B is a plot showing pulling force versus displacement for objects having different diameters, according to some implementations of the present disclosure;

FIG. 10 is a landscape of a bending energy ratio scaled as a function of geometric parameters of a gripping device, according to some implementations of the present disclosure;

FIG. 11A is a plot showing holding force versus a bending energy ratio, according to some implementations of the present disclosure;

FIG. 11B is a plot showing closure force versus a total strain energy stored in a gripping device, according to some implementations of the present disclosure;

FIG. 11C is a bar graph showing a closure force and a holding force for gripping devices having different curvatures, according to some implementations of the present disclosure;

FIG. 11D is a plot showing pinching force versus stretching load, according to some implementations of the present disclosure;

FIG. 11E is a plot showing holding force versus stretching force, according to some implementations of the present disclosure;

FIG. 12A is a three-dimensional plot showing a non-dimensional grasping characteristic length of a griping device versus two-dimensional geometric parameters and a natural curvature of the gripping device, according to some implementations of the present disclosure;

FIG. 12B is a two-dimensional plot of geometric parameters of a gripping device versus a non-dimensional grasping characteristic length, according to some implementations of the present disclosure;

FIG. 12C is a plot of the holding force of a gripping device versus a non-dimensional grasping characteristic length of the gripping device, according to some implementations of the present disclosure;

FIG. 12D is a plot of pinching force versus grasping characteristic lengths of a gripping device, according to some implementations of the present disclosure;

FIG. 13 is a plan view of a gripping device, according to some implementations of the present disclosure;

FIG. 14 is a plan view of a gripping device, according to some implementations of the present disclosure;

FIG. 15A is a plan view of a row of gripping devices for use in a system including an array of gripping devices, according to some implementations of the present disclosure;

FIG. 15B is a perspective view of a system including an array of gripping devices in a first generally open position, according to some implementations of the present disclosure; and FIG. 15C is a perspective view of a system including an array of gripping devices in a second generally closed position, according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Grasping objects is a fundamental posture of humans and animals. Primates (e.g., humans) can precisely grip and manipulate objects based on their hand morphology, which has inspired a variety of engineering robotic gripper designs such as, for example, mechanical linkage-based robotic hands and soft robotic grippers. However, it is difficult to bio-mimic the complex primate thumb-index hand morphology in robotic grippers.

By contrast to primates, some marine animals (e.g., manatees and sea lions) use articulating, flipper-like limps to aid in capturing, feeding, and manipulating prey and other objects. The grasping posture of these marine animals can be categorized either as a holding posture or a pinching posture. For example, a marine turtle can hold a jellyfish while consuming the edible parts. As another example, a sea lion can pinch a fish with its two articulating limbs (e.g., in a similar manner as a human would pinch an object between a thumb and an index finger). These marine-inspired gripping postures can be useful in robotic gripping applications.

Using soft and complaint structures to build robotic gripping devices can provide several advantages compared to traditional linkage-based grippers. As used herein, the terms "soft" or "compliant" refer to materials that are capable of providing continuous elastic deformation through bending. Soft or compliant robotic grippers can conform and adapt to objects having arbitrary shapes via elastic deformation. Such soft of complaint robotic grippers can be actuated using various inputs, such as, for example, fluid-driven actuation (e.g., pneumatic or hydraulic), stimulus responsive materials (e.g., shape memory polymers), dielectric elastomers, magnetic inputs, chemical inputs, photon inputs, granular jamming, or any combination thereof.

Figure 1A:
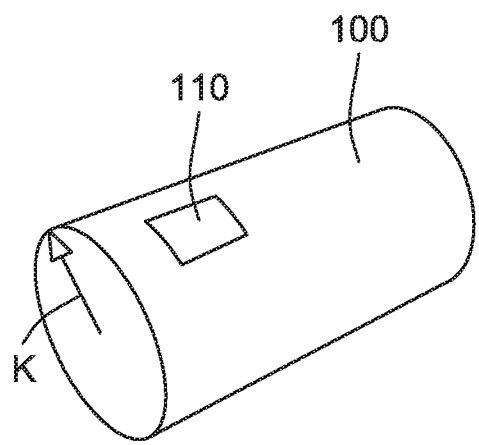
FIG. 1A is a perspective view of a cylinder having a curvature, according to some implementations of the present disclosure.
Figure 1B:
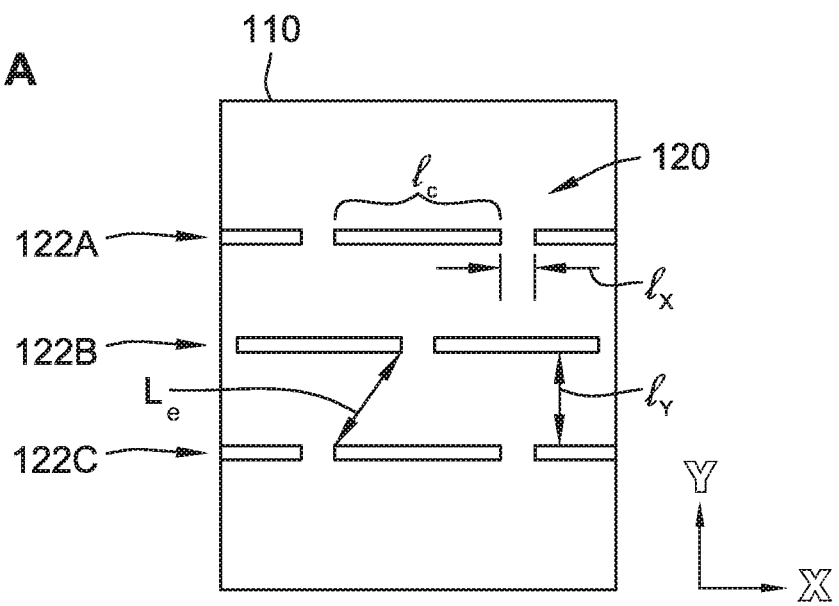
FIG. 1B is a plan view of a sheet cut from the cylinder of FIG. 1A that includes a pattern of slots, according to some implementations of the present disclosure.
Figure 1C:
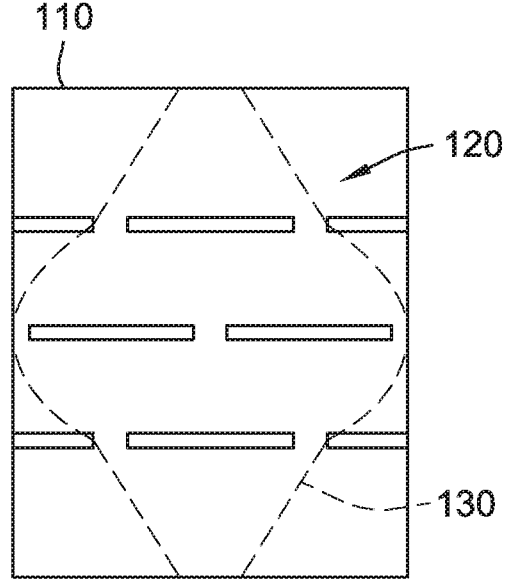
FIG. 1C is a plan view of the sheet of FIG. 1B including an outer perimeter for forming a gripping device, according to some implementations of the present disclosure.

Referring to FIGS. 1A-1C, a first method for making a gripping device according to some implementations of the present disclosure is illustrated. Referring to FIG. 1A, a sheet 110 is cut from a cylinder 100 (e.g., using a laser cutting technique). Alternatively to cutting the sheet 110 from the cylinder 100, the sheet 110 can be cut from any element having any size and/or shape, such that the sheet 110, once cut therefrom, has a curvature as discussed herein. The cylinder 100 has a curvature $k_0$ such that the sheet 110 is biased toward the curvature $k_0$ when cut and removed from the cylinder 100. As shown, the sheet 110 that is cut from the cylinder 100 is generally rectangular, although other sizes and shapes are contemplated (e.g., circular, oval, triangular, polygonal, etc.). The cylinder 100 and the sheet 110 cut therefrom can be made from, for example, polyethylene terephthalate (PETE) and have a thickness that is between about 0.05 mm and about 0.2 mm.

Referring to FIG. 1B, after the sheet 110 is cut and removed from the cylinder 100, a pattern of slots 120 is formed in the sheet 110 in a pattern (e.g., using a laser cutting technique). In some implementations, the pattern of slots 120 is formed in a kirigami pattern. Kirigami is a variation of origami that includes folding and cutting paper to form a two-dimensional or three-dimensional shape, as opposed to only folding the paper. A paper snowflake is one example of kirigami.

The pattern of slots 120 includes a first row of slots 122A, a second row of slots 122B, and a third row of slots 122C. The rows 122A-122C extend along a transverse or x-axis of the sheet 110 (FIG. 1B) or the generatrix of the cylinder 100 (FIG. 1A). Each of the rows 122A-122C are spaced from adjacent ones of the rows 122A-122C along a longitudinal or y-axis of the sheet 110 (FIG. 1B) or the directrix of the cylinder 100 (FIG. 1A). The first row of slots 122A and the third row of slots 122C each have three slots, while the second row of slots 122B has two slots. While pattern of slots 120 is shown as including three rows of slots 122A-122C, more generally, the pattern of slots 120 can include any suitable number of rows of slots including any suitable number of slots in each row.

The pattern of slots 120 is formed in a geometric pattern (e.g., a kirigami pattern) such that each slot in the rows 122A-122C has a predetermined length and width and is spaced from adjacent ones of the slots by a predetermined distance. As shown in FIG. 1B, at least some of the slots in the pattern of slots 120 have a cut length $l_c$ along the transverse or x-axis of the sheet 110. Each of the slots in the first row 122A, the second row 122A, and the third row 122C are spaced from adjacent slots in the same row along the transverse or x-axis of the sheet 110 by a transverse spacing $l_x$. The slots in the first row 122A are spaced from the slots in the second row 122B along the longitudinal or y-axis by a longitudinal spacing $l_y$. Likewise, the slots in the third row 122C are spaced from the slots in the second row 134 along the longitudinal or y-axis by the same longitudinal spacing $l_y$.

The cut length $l_c$, the longitudinal spacing $l_y$, and the transverse spacing $l_x$ can be combined into a pair of non-dimensional parameters $(l_c/l_x, l_c/l_y)$ where the cut length $l_c$ is a scaling factor. Each of the slots in the pattern 120 has a characteristic length $L_e$ that is a function of the cut length $l_c$, transverse spacing $l_x$, and the longitudinal spacing $l_y$. More specifically, characteristic length $L_e$ of each of slots in the pattern of slots 120 can be defined according to Equation (1) below:

$$L_e = \sqrt{(l_c - l_x)/4 + l_y^2}$$  Equation 1

In some implementations, a ratio of the longitudinal spacing $l_y$ and the transverse spacing $l_x$ of the pattern of slots 120 ($l_y/l_x$) is greater than about 1, and a ratio of the longitudinal spacing $l_y$ and the characteristic length $L_e$ of the pattern of slots 120 ($l_y/L_e$) is greater than about 0.75. As described in further detail herein, such ratios in the pattern of slots 120 aid in forming a plurality of hinge portions that permit the gripping device to move from a first (e.g., open) position towards a second (e.g., closed) position to aid in gripping an object.

Referring to FIG. 1C, subsequent to forming the pattern of slots 120 in the sheet 110, the sheet 110 is cut along an outer perimeter 130 (e.g., using a laser cutting technique) to form a gripping device. The sheet 110 is cut along the outer perimeter 130 such that the resulting gripping device includes a plurality of slots (e.g., four total slots including one slot from the first row 122A, two slots from the second row 122B, and one slot from the third row 122C), a pair of opposing jaw portions, and a pair of opposing actuation tabs.

The resulting gripping device is generally used to aid in gripping one or more objects having an arbitrary shape (e.g., spherical balls, ice cubes, screws, rocks, a grain of sand, etc.).

In some implementations, the first method for making a gripping device (FIGS. 1A-1C) includes receiving a generally flat sheet 110 instead of cutting the sheet 110 from the cylinder 100 (FIG. 1A). In such implementations, the generally flat sheet 110 is modified such that the sheet 110 is biased with a natural curvature. The generally flat sheet 110 can be modified by, for example, heating the generally flat sheet 110 over a curved mold to a predetermined temperature (e.g., at or near the glass transition temperature of the material) to cause the sheet 110 to be biased with a natural curvature.

Figure 2A:
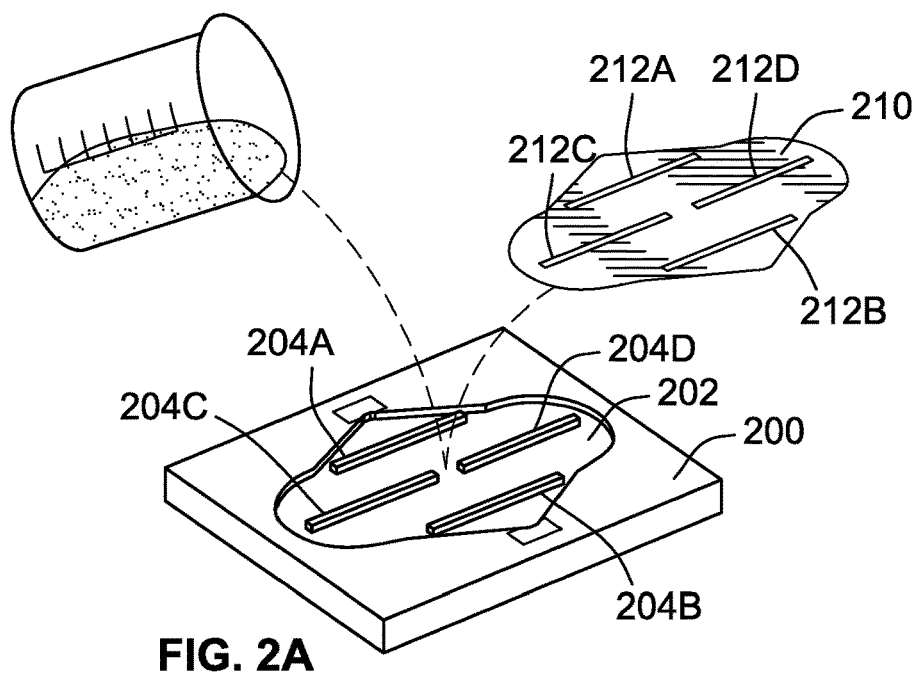
FIG. 2A is a perspective view of a mold including a first cavity and a second cavity and a substrate, according to some implementations of the present disclosure.
Figure 2B:
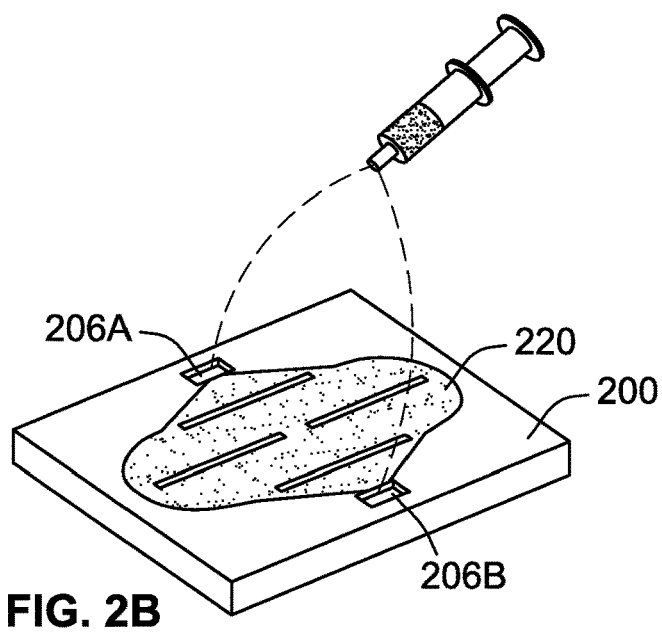
FIG. 2B is a perspective view of substrate of FIG. 2A received in the first cavity of the mold to form a composite, according to some implementations of the present disclosure.
Figure 2C:
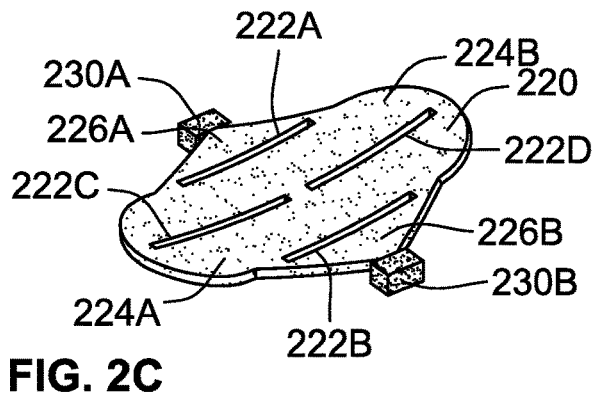
FIG. 2C is a perspective view of the composite of FIG. 2B removed from the mold, according to some implementations of the present disclosure.

Referring to FIGS. 2A-2C, a second method for making a gripping device according to some implementations of the present disclosure is illustrated. Referring to FIG. 2A, a mold 200 includes a first cavity 202 having a plurality of protrusions 204A-204D. The first cavity 202 generally has the same size and shape as the gripping device formed according to the first method described above (FIGS. 1A-1C). Similarly, the plurality of protrusions 204A-204D are formed in a pattern with a geometry that is the same as, or similar to, the pattern of slots 120 (FIG. 1B) described above. In some implementations, the first cavity 202 is generally flat and a natural curvature is imparted to the resulting part after being removed from the mold 200 (e.g., by applying heat). Alternatively, the first cavity 202 can be generally curved.

To form a gripping device using the mold 200, a substrate 210 is positioned in the first cavity 202 of the mold 200. The substrate 210 includes a pattern of slots 212A-212D that are generally sized and shaped such that each of the slots 212A-212D can receive at least a portion of a corresponding one of the protrusions 204A-204D therein when the substrate 210 is positioned within the first cavity 202 of the mold 200. In some implementations, the substrate 210 is cellulose paper.

Referring to FIG. 2B, when the substrate 210 is positioned within the first cavity 202 of the mold 200, the first cavity 202 is at least partially filed with a material to form a composite 220 including the substrate 210 (FIG. 2A) and the first material. In some implementations, the material includes polyvinyl siloxane, poly-di-methyl-siloxane (PDMS), or both.

In some implementations, the cavity 200 also includes a pair of magnetic element cavities 204A-204B. In such implementations, the pair of magnetic element cavities 204A-204B (FIGS. 2A-2B) can be at least partially filled with a second material after the composite 220 (FIG. 2B) is formed to form pair of magnetic elements 230A-230B (FIG. 2C). Subsequent to at least partially filling the pair of magnetic element cavities 204A-204B, the second material can be heated at a predetermined temperature (e.g., about 80 degrees Celsius) for a predetermined duration (e.g., about 1 hour). The second material includes a ferromagnetic material (e.g., iron) and a polymer material (e.g., polydimethylsiloxane). The predetermined temperature and/or predetermined duration can be selected based on the properties of the second material.

Referring to FIG. 2C, subsequent to heating the second material in the pair of magnetic element cavities 204A-204B, the composite 220 can be removed from the mold 200. The resulting composite 220 includes a pattern of slots 222A-222D that correspond to the plurality of protrusions 204A-204D in the first cavity 202 and the plurality of slots 212A-212D in the substrate 210 (FIG. 2A). The composite 220 also includes a pair of opposing jaw portions 224A-224B, a pair of opposing actuation tabs 226A-226B, and a pair of magnetic elements 230A-230B.

The pair of magnetic elements 230A-230B are coupled to corresponding ones of the pair of opposing actuation tabs 226A. As described in further detail herein, applying a magnetic field to of pair of magnetic elements 230A-230B causes the pair of opposing actuation tabs 226A-226B to move in generally opposite directions and actuate the pair of opposing jaw portions 224A-224B.

Figure 3:
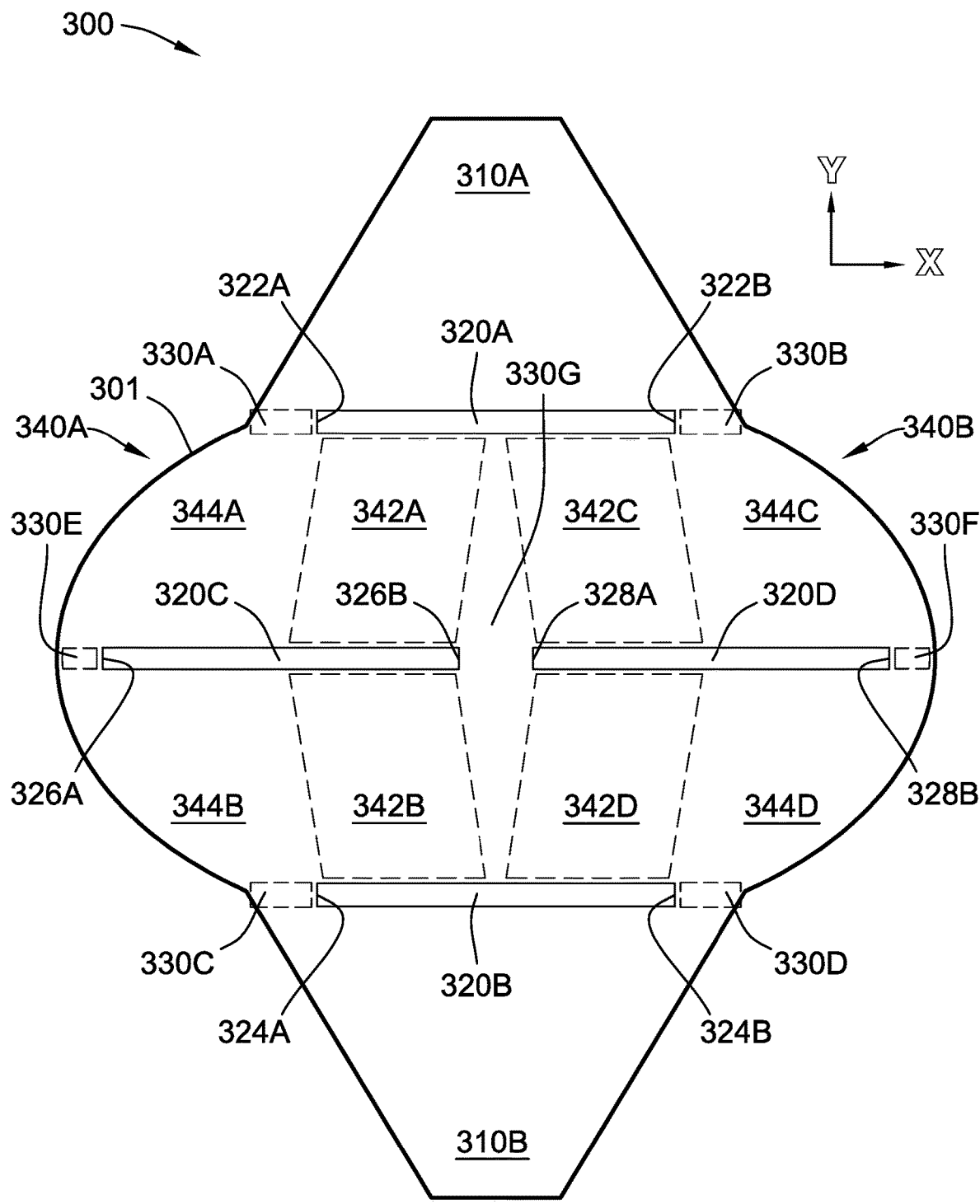
FIG. 3 is a plan view of a gripping device, according to some implementations of the present disclosure.

Referring to FIG. 3, a gripping device 300 according to some implementations of the present disclosure is illustrated. The gripping device 300 can be made using the first method described above (FIGS. 1A-1C), the second method described above (FIGS. 2A-2C), or any other suitable method(s) of manufacture (e.g., laser cutting, injection molding, stamping, etching, etc., or any combination thereof).

The gripping device 300 includes a pair of opposing actuation tabs 310A-310B, a pattern of slots 320A-320D, a plurality of hinge portions 330A-330G, and a pair of opposing jaw portions 340A-340B. Generally, the pair of opposing jaw portions 340A-340B of the gripping device 300 can be used to grip an object in response to an input being applied to the pair of opposing actuation tabs 310A-310B.

The gripping device 300 is made from a compliant material (e.g., a polymer such as polyvinyl siloxane (PVS) or PDMS) and is generally biased with a natural curvature. The natural curvature acts a global imperfection in the gripping device 300 that triggers grasping or gripping movement. If the gripping device 300 were not generally biased with a natural curvature, the gripping device 300 would buckle into a symmetric bending mode.

The pair of opposing actuation tabs 310A-310B includes a first actuation tab 310A and a second actuation tab 310B. As shown, the pair of opposing actuation tabs 310A-310B each have a general trapezoidal or triangular shape, although other shapes are contemplated (e.g., rectangular, curved, polygonal, etc.). As described in further detail herein, movement of the pair of opposing actuation tabs 310A-310B in generally opposite directions (e.g., along the longitudinal or y-axis of the gripping device 300) in response to an input causes corresponding movement of the pair of opposing jaw portions 340A-340B to aid in gripping an object.

The pattern of slots 320A-320D is the same as, or similar to, the pattern of slots 120 (FIG. 1B) described above and includes a first slot 320A, a second slot 320B, a third slot 320C, and a fourth slot 320D. Each of the slots 320A-320D generally extend along the transverse or x-axis of the gripping device 300 and have a length defined by opposing ends of the slots 322A-322D. More specifically, the first slot 320A has a first end 322A and a second opposing end 322B, the second slot 320B has a first end 324A and a second opposing end 324B, the third slot 320C has a first end 326A and a second opposing end 326B, and the fourth slot 320D includes a first end 328A and a second opposing end 328B.

Like the pattern of slots 120 (FIG. 1B) described above, the first slot 322A is spaced from the third slot 322C and the fourth slot 322D along the longitudinal or y-axis by a longitudinal spacing. Likewise, the second slot 322B is spaced from the third slot 322C and the fourth slot 322D along the longitudinal or y-axis by the same longitudinal spacing. The second end 326B of the third slot 320C is spaced from the first end 328A of the fourth slot 320D along the transverse or x-axis by a transverse spacing. A characteristic length of each of the slots 320A-320D can be defined according to equation (1) above.

The geometric pattern of the slots 320A-320D governs the formation of the plurality of hinge portions 330A-330G. More specifically, to form the plurality of hinge portions 330A-330G, in some implementations, a ratio of the longitudinal spacing and the transverse spacing of the pattern of slots 320A-320D ($l_y/l_x$) is greater than about 1, and a ratio of the longitudinal spacing and the characteristic length of the pattern of slots 320A-320D ($l_y/L_e$) is greater than about 0.75.

The plurality of hinge portions 330A-330G generally permit elastic deformation at one or more locations of the gripping device 300 to permit bending movement of the pair of opposing jaw portions 340A-340B. The plurality of hinge portions 330A-330G includes a first hinge portion 330A, a second hinge portion 330B, a third hinge portion 330C, a fourth hinge portion 330D, a fifth hinge portion 330E, a sixth hinge portion 330F, and a seventh hinge portion 330G. In some implementations, each of the plurality of hinge portions 330A-330G is and/or includes a portion of the gripping device 300 where stress and/or strain is concentrated when the gripping device 300 is actuated (e.g., when the actuation tabs 310A and/or 310B are moved apart from one another).

The pair of opposing jaw portions 340A-340B includes a plurality of parallelogram portions 342A-342D and a plurality of end portions 344A-344D. The first jaw portion 340A includes a first parallelogram portion 324A, a second parallelogram portion 324B, a first end portion 344A, and a second end portion 344B. The second jaw portion 340B includes a third parallelogram portion 324C, a fourth parallelogram portion 324D, a third end portion 344C, and a fourth end portion 344D.

In some implementations, the plurality of parallelogram portions 342A-342D have a first thickness and the plurality of end portions 344A-344D have a second thickness that is different from the first thickness. For example, the first thickness can be between about 1.1 and about 5 times greater than the second thickness. As described in further detail herein, the parallelogram portions 342A-342D store strain energy responsive to axial stretching of the pair of opposing actuation tabs 310A-310B. Thus, increasing the thickness of the parallelogram portions 342A-342D increases the total amount of strain energy that can be stored in the gripping device 300 before failure (e.g., plastic deformation).

The first actuation tab 310A is coupled to the first end portion 344A of the first jaw portion 340A at the first hinge portion 330A, and coupled to the third end portion 344C of the second jaw portion 340B at the second hinge portion 330B. The first hinge portion 330A is positioned between an outer perimeter 301 of the gripping device 300, the first end 322A of the first slot 320A, the first actuation tab 310A, and the first end portion 344A of the first jaw portion 340A. Similarly, the second hinge portion 330B is positioned between the outer perimeter 301 of the gripping device 300, the second end 322B of the first slot 320A, the first actuation tab 310A, and the third end portion 344C of the second jaw portion 340B.

The second actuation tab 310B is coupled to the second end portion 344B of the first jaw portion 340A at the third hinge portion 330C and coupled to the fourth end portion 344D of the second jaw portion 340B at the fourth hinge portion 330D. The third hinge portion 330C is positioned between the outer perimeter 301 of the gripping device 300, the first end 324A of the second slot 320B, the second actuation tab 310B, and the second end portion 344B of the first jaw portion 340A. Similarly, the fourth hinge portion 330D is positioned between the outer perimeter 301 of the gripping device 300, the second end 324B of the second slot 320B, the second actuation tab 310B, and the fourth end portion 344D of the second jaw portion 340B.

The first parallelogram portion 342A and the first end portion 344A of the first jaw portion 340A are generally positioned between the first slot 320A and the third slot 320C. An upper edge of the first parallelogram portion 342A generally extends from the first end 322A of the first slot 320A to a midpoint of the first slot 320A that is equidistant between the first end 322A and the second end 322B. A lower edge of the first parallelogram portion 342A generally extends from a midpoint of the third slot 320C and the second end 326B of the third slot 320C. The first end portion 344A is positioned between the first hinge portion 350A, the first parallelogram portion 342A, the outer perimeter 301 of the gripping device 300, and the third slot 320C. An outer edge of the first end portion 344A defined by the outer perimeter 301 of the gripping device 300 has a generally curved shape.

The second parallelogram portion 342B and the second end portion 344B of the first jaw portion 340A are generally positioned between the third slot 320C and the second slot 320B. An upper edge of the second parallelogram portion 342B generally extends from a midpoint of the third slot 320C to the second end 326B of the third slot 320C. A lower edge of the second parallelogram portion 342B generally extends from the first end 324A of the second slot 320B and a midpoint of the second slot 320B. The second end portion 344B is positioned between the third hinge portion 330C, the fifth hinge portion 330E, the second parallelogram portion 342B, the third slot 320C, and the outer perimeter 301 of the gripping device 300. An outer edge of the second end portion 344B defined by the outer perimeter 301 of the gripping device 300 has a generally curved shape.

The third parallelogram portion 342C and the third end portion 344C of the second jaw portion 340B are generally positioned between the first slot 320A and the third slot 320C. An upper edge of the third parallelogram portion 342C generally extends from the midpoint of the first slot 320A and the second end 322B of the first slot 320A. A lower edge of the third parallelogram portion 342C generally extends from the first end 328A of the fourth slot 320D and a midpoint of the fourth slot 320D. The third end portion 344C is positioned between the second hinge portion 350B, the third parallelogram portion 342C, the outer perimeter 301 of the gripping device 300, and the fourth slot 320D. An outer edge of the third end portion 344C defined by the outer perimeter 301 of the gripping device 300 has a generally curved shape.

The fourth parallelogram portion 342D and the fourth end portion 344D of the second jaw portion 340B are generally positioned between the fourth slot 320D and the second slot 320B. An upper edge of the fourth parallelogram portion 342D generally extends from the first end 328A of the fourth slot 320D and a midpoint of the fourth slot 320D. A lower edge of the fourth parallelogram portion 342D extends from the midpoint of the second slot 320B and the second end 324B of the second slot 320B. The fourth end portion 344D is positioned between the sixth hinge portion 330F, the fourth hinge portion 330D, the fourth parallelogram portion 342D, the fourth slot 320D, and the outer perimeter 301 of the gripping device 300. An outer edge of the second end portion 344D defined by the outer perimeter 301 of the gripping device 300 has a generally curved shape.

The fifth hinge portion 330E is positioned between the outer perimeter 301 of the gripping device 300, the first end 326A of the third slot 320C, the first end portion 344A, and the second end portion 344B. The sixth hinge portion 330F is positioned between the outer perimeter 301 of the gripping device 300, the second end 328B of the fourth slot 320D, the third end portion 344C, and the fourth end portion 344D.

The seventh hinge portion 330G is positioned between the second end 326B of the third slot 320C, the first end 328A of the fourth slot 320D, and the plurality of parallelogram portions 342A-342D. The seventh hinge portion 330G has a generally diamond shape. In some implementations, the seventh hinge portion 330G is referred to as a main hinge portion or a central hinge portion.

In some implementations, at least a portion of the pair of opposing jaw portions 340A-340B have a first thickness and one or more of the plurality of hinge portions 330A-330G have a second thickness and that is greater than the first thickness (e.g., between about 1.1 and about 5 times greater than the first thickness). Similarly, in some implementations, the pair of opposing jaw portions 340A-340B include a first material and at least one of the plurality of hinge portions 330A-330G includes a second material that is different than the first material. For example, the first material can be a first type of polymer (e.g., including polyvinyl siloxane, PDMS, or both) and the second material can be a second type of polymer (e.g., rubber).

In some implementations, the gripping device 300 includes one or more magnetic elements that are the same as, or similar to, the magnetic elements 230A-230B described above (FIG. 2C). In some such implementations, the one or more magnetic elements are coupled to or integrated in the pair of actuation tabs 310A-310B. In such implementations, the input can be a magnetic field that acts upon the one or more magnetic elements to actuate the gripping device 300.

In some implementations, the gripping device 300 also includes one or more gripping pads that aid in gripping in an object. For example, the gripping device 300 can include a first gripping pad coupled to the first jaw portion 340A and a second gripping pad coupled to the second jaw portion 340B. In such implementations, the pair of opposing jaw portions 340A-340B can be made from a first material (e.g., including a polymer), while the gripping pads are made from a second material that is different than the first material (e.g., including felt). For example, the second material can have a coefficient of friction that is greater than a coefficient of friction of the first material to further aid in gripping an object using the gripping device 300.

Figure 4A:
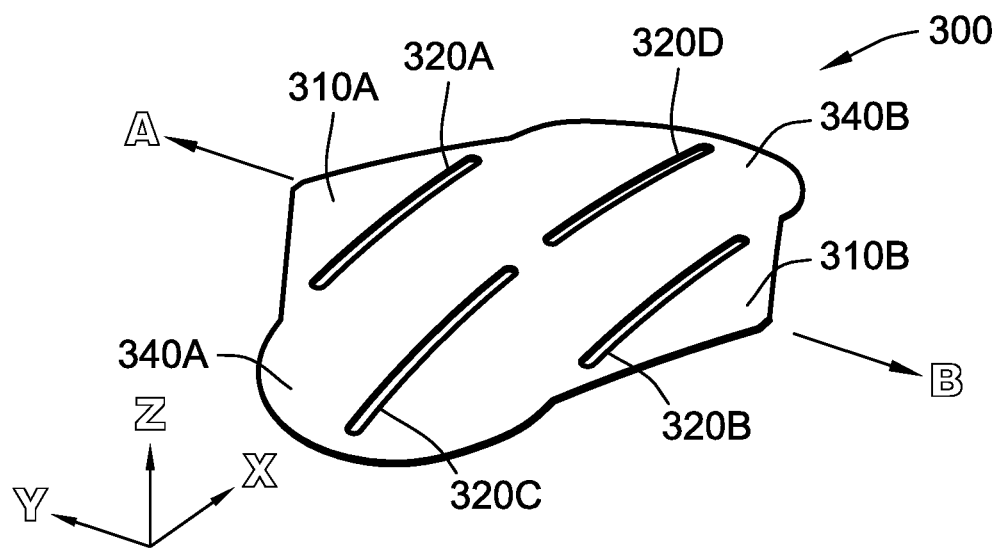
FIG. 4A is a perspective view of a gripping device of FIG. 3 in a first position, according to some implementations of the present disclosure.
Figure 4B:
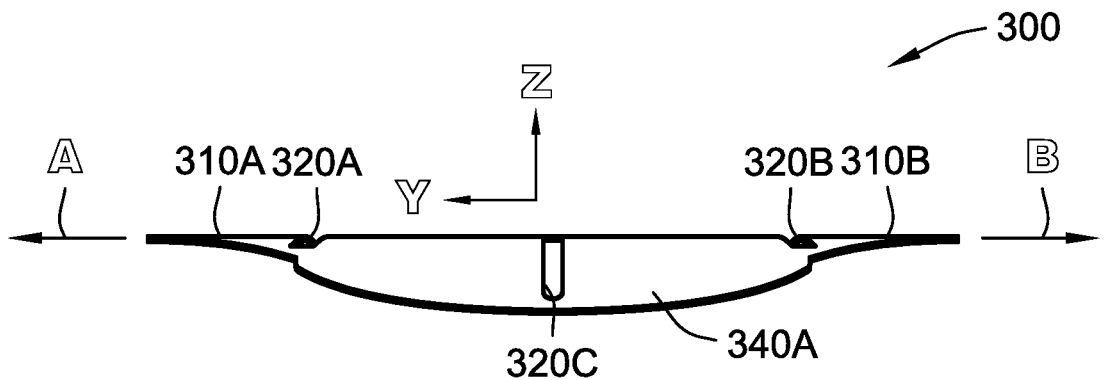
FIG. 4B is a side view of the gripping device in the first position, according to some implementations of the present disclosure.
Figure 4C:
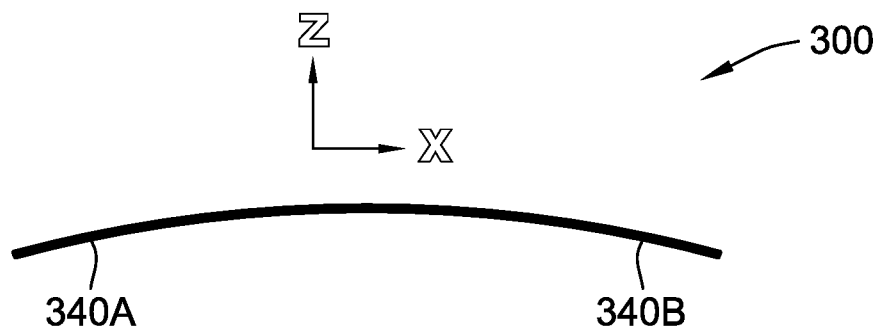
FIG. 4C is an end view of the gripping device in the first position, according to some implementations of the present disclosure.

Referring generally to FIGS. 4A-4C, the gripping device 300 is illustrated with the pair of opposing jaw portions 340A-340B in a first generally open position. As described herein, the plurality of hinge portions 330A-330G (FIG. 3) permit elastic movement of at least a portion of the gripping device 300 (e.g., bending movement) responsive to the pair of opposing actuation tabs 310A-310B moving in generally opposite directions. For example, the first actuation tab 310A can be moved generally in the direction of arrow A and the second actuation tab 310B can be moved generally in the direction of arrow B to cause movement of the pair of opposing jaw portions 340A-340B.

The pair of opposing actuation tabs 310A-310B can be caused to move in generally opposite directions using, for example, a mechanical input via a mechanism that is directly coupled to the pair of opposing actuation tabs 310A-310B and applied an axial stretching load to at least one of the pair of opposing actuation tabs 310A-310B. The mechanism can be, for example, robotic arm(s), human hand(s), or any other suitable mechanism for applying an axial stretching load to the pair of opposing actuation tabs 310A-310B.

As described above, in some implementations, the gripping device 300 can include a pair of magnetic elements that are the same as, or similar to, the pair of magnetic elements 230A-230B described above. In such implementations, the magnetic elements are coupled to or integrated in the pair of opposing actuation tabs 310A-310B such that the pair of opposing actuation tabs 310A-310B can be caused to move in generally opposite directions in response to a magnetic input (e.g., a magnetic field).

Figure 5A:
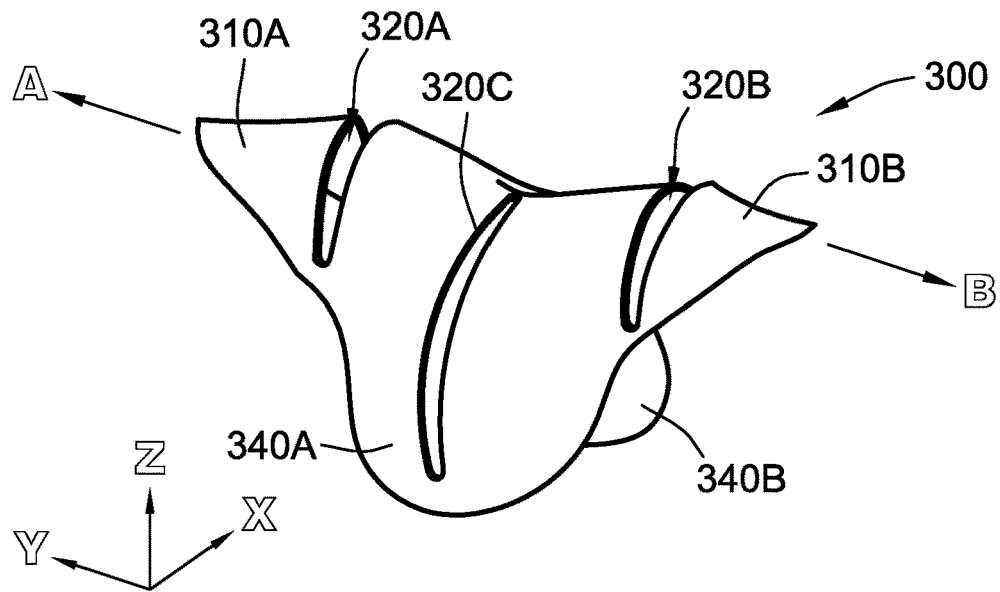
FIG. 5A is a perspective view of the gripping device of FIG. 3 in a second position, according to some implementations of the present disclosure.
Figure 5B:
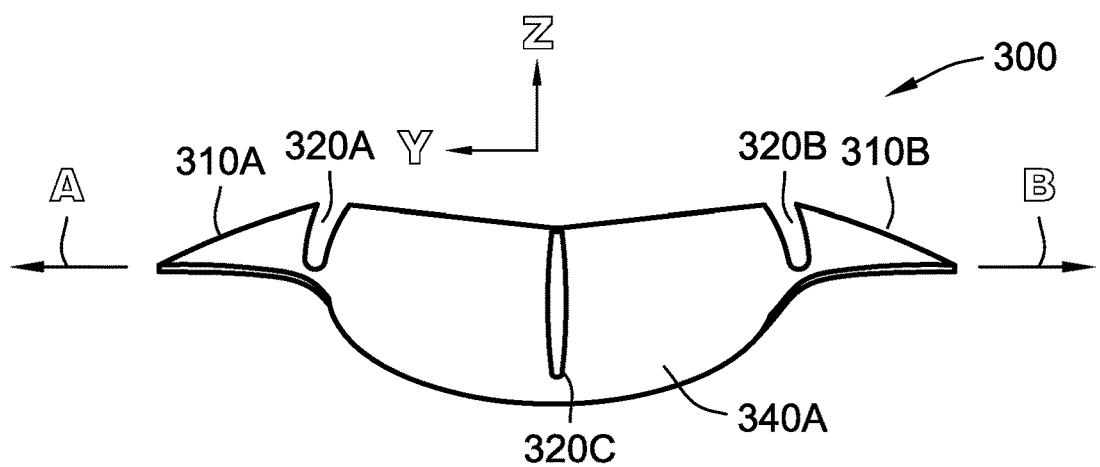
FIG. 5B is a side view of the gripping device in the second position, according to some implementations of the present disclosure.
Figure 5C:
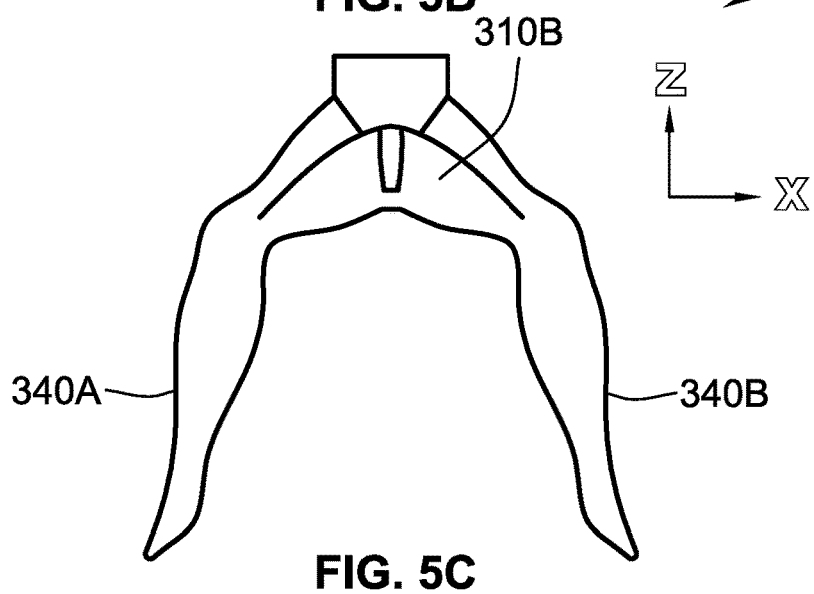
FIG. 5C is an end view of the gripping device in the second position, according to some implementations of the present disclosure.
Figure 6A:
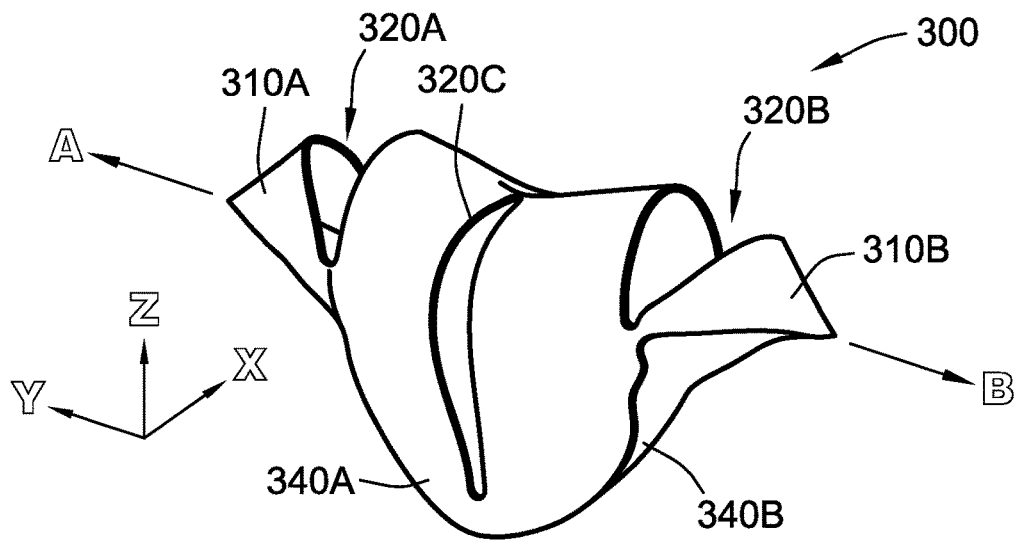
FIG. 6A is a perspective view of the gripping device of FIG. 3 in a third position, according to some implementations of the present disclosure.
Figure 6B:
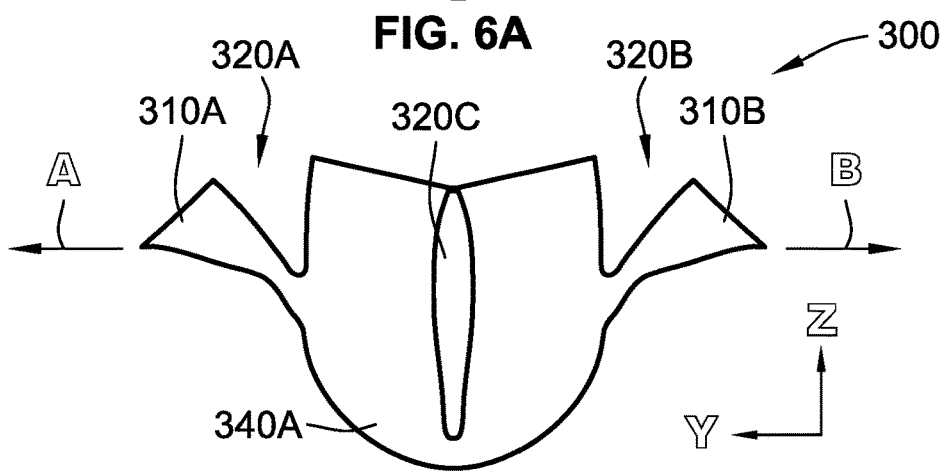
FIG. 6B is a side view of the gripping device in the third position, according to some implementations of the present disclosure.
Figure 6C:
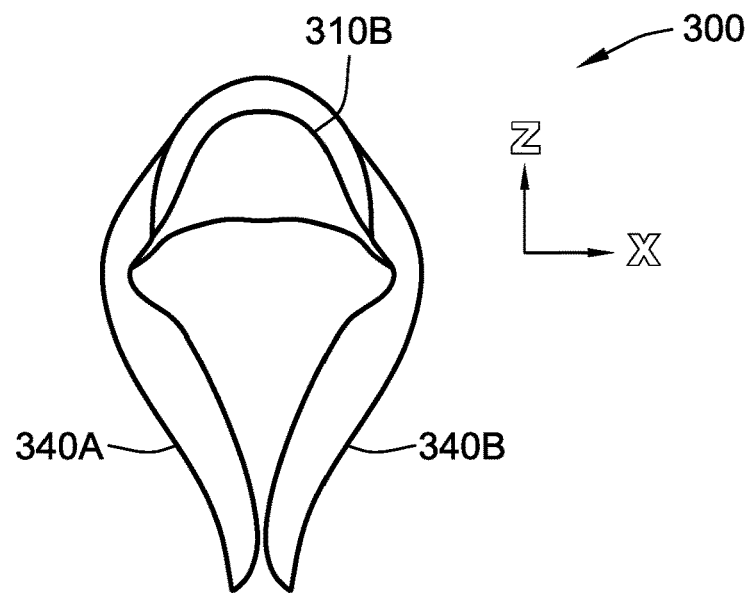
FIG. 6C is an end view of the gripping device in the third position, according to some implementations of the present disclosure.

Referring generally to FIGS. 5A-5C, the gripping device 300 is illustrated with the pair of opposing jaw portions 340A-340B having moved from the first generally open position (FIGS. 4A-4C) towards a second generally closed position (FIGS. 6A-6C). As shown by a comparison between FIGS. 5A-5C and FIGS. 4A-4C, causing the pair of opposing actuation tabs 310A-310B to move in generally opposite directions (e.g., in the directions of arrows A and B) causes the pair of opposing jaw portions 340A-340B to move in the y-z plane and symmetrically bend about the y-axis of the gripping device 300. The pair of opposing actuation tabs 310A-310B also deflect downwards relative to the z-axis responsive to the axial stretching input. Upon stretching, relative deflection of the connected edges induced by the buckling leads to internal torsion. The internal torsion appears symmetrically in the plurality of parallelogram portions 342A-342D (FIG. 3), giving rise to the overall symmetric grasping or gripping movement.

The gripping device 300 has an initial natural curvature in the first open position, as best shown in FIG. 4C. Subsequent to the pair of opposing actuation tabs 310A-310B moving in generally opposite directions, the gripping device 300 has a second, modified curvature (FIG. 5C) that is different than (e.g., greater than) the natural curvature. Similarly, each of the slots 320A-320D has a first shape (e.g., generally rectangular) when the gripping device 300 is in the first open position (FIGS. 4A-4B). Subsequent to the pair of opposing actuation tabs 310A-310B moving in generally opposite directions, the slots 320A-320D have a second modified shape (FIGS. 5A-5B) that is different than the first shape.

Referring generally to FIGS. 6A-6C, the gripping device 300 is illustrated with the pair of opposing jaw portions 340A-340B in a second generally closed position. As best shown in FIG. 6C, in the second closed position, at least a portion of the first jaw portion 340A contacts at least a portion of the second jaw portion 340B. For example, at least a portion of the first end portion 344A and the second end portion 344B of the first jaw portion 340A (FIG. 3) contact at least a portion of the third end portion 344C and the fourth end portion 344D of the second jaw portion 340B when the pair of opposing jaw portions 340A-340B are in the second generally closed position.

As shown in FIG. 6B, at least some of the slots 320A-320D have different shapes when the pair of opposing jaw portions 340A-340B are in the second generally closed position. For example, the first slot 320A and the second slot 320B have a first shape and the third slot 320C and the fourth slot 320D have a second shape that is different than the first shape.

In this manner, the pair of opposing jaw portions 340A-340B of the gripping device 300 can be moved from the first generally open position (FIGS. 4A-4C) towards the second generally closed position (FIGS. 6A-6C) to grasp objects having an arbitrary shape (e.g., spherical balls, hydrogel balls, a grain of sand, a pill, a screw, a rock, an ice cube, or any other object having any shape).

In such implementations where the gripping device 300 includes magnetic elements, the gripping device 300, the magnetic input can cause the gripping device to move from the first generally open position (FIGS. 4A-4C) to the second generally closed position (FIGS. 6A-6C) responsive to a magnetic field input (e.g., with a constant magnetic flux). The magnetic field can cause the gripping device to move from the first generally open position (FIGS. 4A-4C) to the second generally closed position (FIGS. 6A-6C) in, for example, between about 50 ms and about 200 ms, between about 65 ms and about 150 ms, etc. In one example, the gripping device 300 can be positioned in an aquatic environment (e.g., water) and can capture a free falling object (e.g., a stone) in response to the magnetic field. Thus, the magnetic elements described herein can be used for high-speed magnetic actuation of the gripping device 300.

Figure 7:
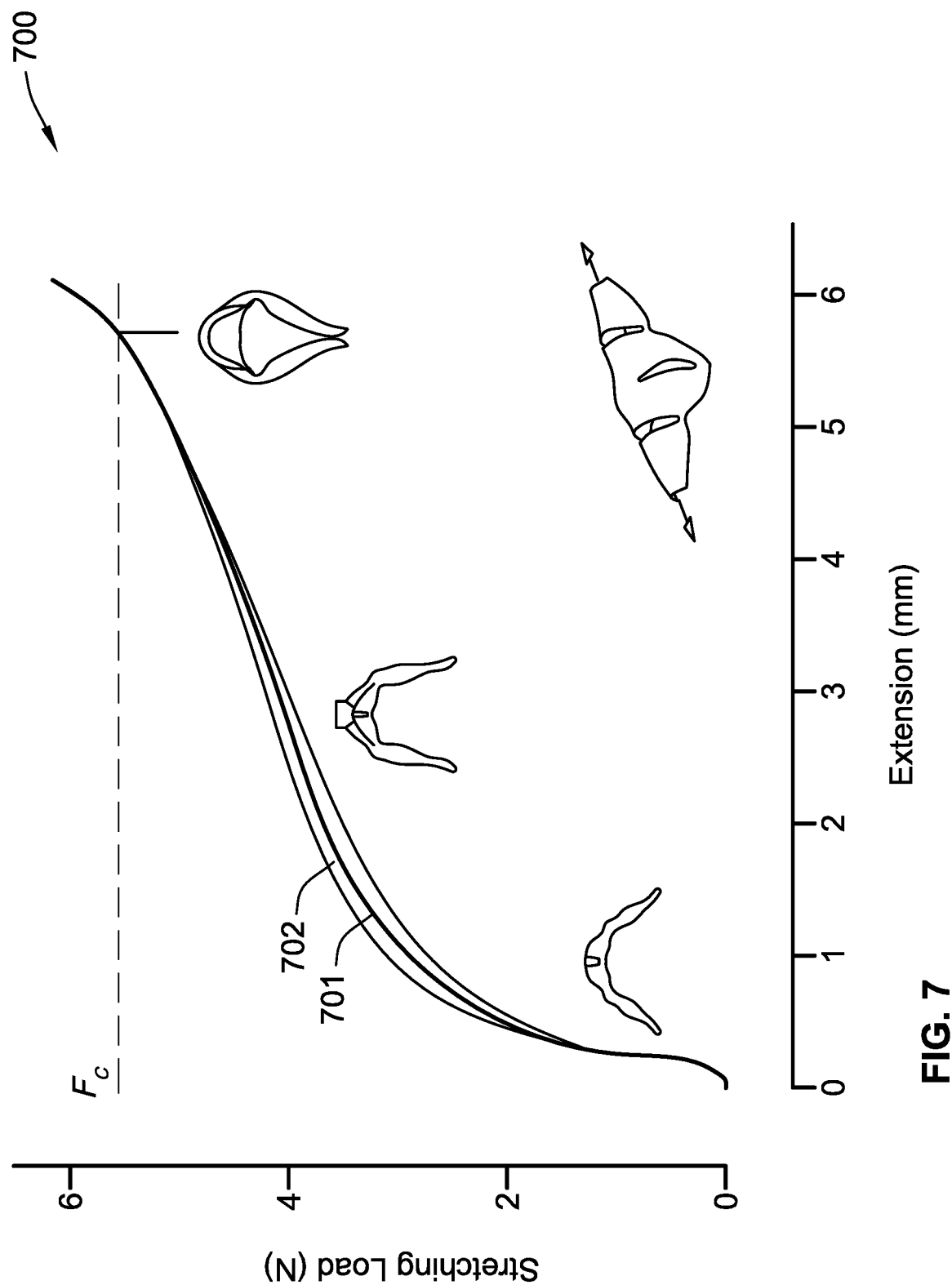
FIG. 7 is a plot showing a stretching load applied to a pair of opposing actuation tabs of the gripping device of FIG. 3 versus extension of the pair of actuation tabs for five uni-axial tests, according to some implementations of the present disclosure.

Referring to FIG. 7, a plot 700 showing stretching load (N) versus extension (mm) of the pair of actuation tabs 310A-310B for five uni-axial tests is illustrated. In each uni-axial test, a uni-axial extension was applied at one of the pair of opposing actuation tabs of the gripping device with the other one of the pair of opposing actuation tabs fixed. Line 701 represents the averaged results and area 702 surrounding the line 701 represents the standard deviation. As shown by the plot 700, higher energy input is required to close the pair of opposing jaw portions 340A-340B from the first generally open position (FIGS. 4A-4C). The change in stretching load as a function of extension decreases until the gripping device 300 is in the second generally closed position (FIGS. 6A-6C). This behavior is similar to a non-linear spring. When the gripping device 300 is in the second generally closed position, the corresponding stretching load is defined as a closure force $F_c$, whose value depends on the geometry of the gripping device 300.

The gripping devices described herein can grasp an object by applying a holding force, a pinching force, or both. Under deformation, the gripping device 300 forms a three-dimensional capsule that can at least partially enclose an object. By modifying the geometry of the pair of opposing jaw portions (e.g., modifying the shape of the end portions 344A-344D (FIG. 3) described above), the griping device can grasp objects having any arbitrary shape and/or size and/or weight.

For example, referring to FIG. 8A, the gripping device 300 can apply a holding force $F_h$ to grasp a generally spherical object 800. As the spherical object 800 is pulled downward in the direction of arrow C, the angle θ because the holding force and the horizontal plane decreases, causing the vertical component of the holding force $F_h$ to decrease and the horizontal component of the holding force $F_h$ to increase. Referring to FIG. 8B, when the angle θ approaches zero, the static force balance in the vertical direction breaks, and the horizontal component of the holding force $F_h$ becomes a pinching force $F_p$ for grasping the object 800.

Referring to FIG. 8A, the distance between the two contact interfaces between the gripping device 300 and the object 800 (denoted by ξ) when the gripping device 300 is in a holding posture increases as the object 800 is pulled in the direction of arrow C. At the point when the angle θ reaches 0, ξ approaches its maximum value which is equal to the diameter of the object 800. Ignoring friction, the object 800 will be pulled out from the gripping device 300 at this point, and the load carrying capacity measured by the maximum holding force can be determined through measuring the pulling load.

Referring to FIG. 9A, a plot 900 showing pulling force versus displacement for three different object cross-sectional geometries is illustrated. A first line 901 shows pulling force versus displacement for a first object with a circular cross-sectional geometry, a second line 902 shows pulling force versus displacement for a second object with a square cross-sectional geometry, and a third line 903 shows pulling force versus displacement for a third object with a triangular cross-sectional geometry. If d is the diameter of an inscribed circle in the square and triangular cross-sections (lines 902 and 903), the maximum possible distance between two contact interfaces for the square cross-sectional geometry and the triangular cross-sectional geometry are $\xi_{max} = d/\sqrt{2}$ and $\xi_{max} = d\sqrt{3}/2$, respectively. In this example, the holding force for the first object (represented by line 901) is 0.61 N, the holding force for the second object (represented by line 902) is 0.51 N, and the holding force for the third object (represented by line 903) is 0.45 N. The plot 900 indicates that objects with a larger $\xi$ will have a larger holding force.

Referring to FIG. 9B, a plot 910 showing pulling force versus displacement for three different object cross-sectional geometries is illustrated. A first line 911 shows pulling force versus displacement for a first object having a first diameter (e.g., 9.5 mm), a second line 912 shows pulling force versus displacement for a second object having a second diameter that is less than the first diameter (e.g., 8 mm), and a third line 913 shows pulling force versus displacement for a third object having a third diameter that is less than the second diameter (e.g., 6 mm).

A simplified mechanical model can be used to quantitatively describe the gripping action of the gripping devices described herein. In this simplified model, the main or central hinge (e.g., seventh hinge 330G (FIG. 3)) is approximated as a tape spring and the parallelogram sheets (e.g., parallelogram portions 342A-342D) is transformed into beams using skew plate approximation. The stretching energy is much smaller than the bending energy, so stretching energy can be ignored. At a given stretching load, the bending energy stored in the main or central hinge ($U_H$) is scaled according to equation (2) below and the bending energy stored in the parallelogram portions ($U_S$) is scaled according to equation (3) below, where h is the thickness of the gripping device, E is Young's modulus, and v is Possion's ratio.

$$U_H \approx Eh^3 l_y^3 / L_e^2 \qquad \text{Equation (2)}$$

$$U_S \approx Eh^3 l_x l_y / (1-v) L_e^2 \qquad \text{Equation (3)}$$

As the gripping device moves from the first generally open position (e.g., as shown FIGS. 4A-4C) towards the second generally closed position (e.g., as shown in FIGS. 6A-6C), the work done by the stretching load is converted into strain energy stored in the gripping device. To pull an object from the gripping device, the external work done by the pulling force must overcome a certain amount of the strain energy stored in the gripping device. Since the rotation axis of the main or central hinge (x-axis) is in the same plane (x-z plane) as the gripping action, elastic hinge energy may not contribute to the gripping device opening. On the other hand, the holding reaction force induced internal bending moment will release bending energy stored in the parallelogram portions of the gripping device.

Thus, in this simplified model, the total strain energy stored in the gripping device ($U_S+U_H$) will determine the closure force $F_c$, and the ratio between the parallelogram portion bending energy and total energy $U_S/(U_S+U_H)$ will determine the holding force for the gripping device. Referring to FIG. 10, a landscape of the energy ratio ($U_S/(U_S+U_H)$) scaled as a function of the geometric parameters ($l_c/l_y$) and ($l_c/l_x$) is illustrated. The energy ratio landscape in FIG. 10 provides a design guideline to maximize the load carrying capacity by modifying the geometry of the gripping device (e.g., the geometry of the pattern of slots).

Referring generally to FIGS. 11A-11E, four pairs of geometric parameters ($l_c/l_y$, $l_c/l_x$) are selected to fabricate gripping devices. Specifically, the following parameters were selected: (2.5, 2.5), (3.5, 2.0), (5.0, 2.0), and (5.0, 1.5).

In FIG. 11A, the holding force $F_h$ of the gripping devices is plotted versus the energy ratio ($U_S/(U_S+U_H)$). In FIG. 11B, the closure force $F_c$ of the gripping devices is plotted against the total strain energy ($U_S+U_H$) stored in the gripping device. As shown in FIGS. 11A and 11B, as the bending energy ratio increases, the holding force also increases. These figures also show that the closure force is correlated with the total strain energy stored in the gripping device.

Referring to FIG. 11C, the gripping device with the (5.0, 2.0) geometric parameters is shown to the effect from the normalized natural curvature $\kappa_0 h$, where h is the thickness of the gripping device, and is in this example, 0.127 mm. As shown in FIG. 11C, the value of the natural curvature may not affect the holding force, but will affect the closure force. In this example, the holding force is 0.684 N and the closure force is 4.07 N where $\kappa_0 h$ is 0.0013, while the holding force is 0.675 N and the closure force is 4.91 N where $\kappa_0 h$ is 0.0033.

Referring to FIG. 11D, a force transmission factor that is indicative of the efficiency of the gripping device can be calculated as $F_h/F_c$. As shown in FIG. 11D, the force transmission factor is 5.9%, 11.1%, 13.9%, and 11.4% for the gripping devices with the (2.5, 2.5), (3.5, 2.0), (5.0, 2.0), and (5.0, 1.5) geometric parameters, respectively.

FIG. 11E, an over-stretched load and the corresponding holding force are normalized by $F_c$ and $F_h$, respectively. The stretching load increases starting from approximately 5% to approximately 22% of $F_c$. The corresponding holding force $F_h$ increases up to 90% of Fn. Thus, FIG. 11E indicates that the holding capacity of the gripping device can be increased by a relatively small amount of over-stretching, provided that the gripping device is not over-stressed (e.g., the gripping device continues to undergo elastic deformation, as opposed to plastic deformation).

To further optimize the holding capacity of the gripping devices described herein, the bending energy of the parallelogram shells 342A-342D can be expressed according to equation (4) below and the bending energy of the seventh hinge portion 330G can be expressed according to equation (5) below.

$$U_b^s = \frac{D(l_y - t_c)}{2L_e^3}\left(\frac{\phi_0^3}{0.5[\phi_0 + 2\phi_0\sin^2\phi_0(3\cos\phi_0 - 4)]}\right)\delta_y^2 \qquad \text{Equation (4)}$$

$$U_b^h = \frac{2(1+v)Dl_x}{L_e^2}\left(\frac{\phi_0^2\sin\phi_0}{0.5[\phi_0 + 2\phi_0\sin^2\phi_0(3\cos\phi_0 - 4)]}\right)\delta_y^2 \qquad \text{Equation (5)}$$

In equations (4) and (5), $d_y$ refers to the distance each of the pair of opposing actuations tabs 310A-310B move along the y-axis in response to the input (e.g., the distance the actuation tabs 310A-310B move from their position shown in FIG. 4B to their position shown in FIG. 6B). $t_c$ refers to the width of each of the slots 320A-320D, $l_x$ refers to the transverse spacing of the pattern of slots 320A-320D, $l_y$ refers to the longitudinal spacing of the pattern of slots 320A-320D, and $L_e$ refers to the characteristic length of each of the slots 320A-320D. $\phi_0$ and D can be expressed according to equations (6) and (7) below.

$$\phi_0 = k_0 \times L_e / 2 \qquad \text{Equation (6)}$$

$$D = \frac{E h_e^3}{12(1-v^2)} \qquad \text{Equation (7)}$$

In equations (6) and (7), D is the flexural rigidity of the device, E is Young's Modulus, $h_e$ is the elastic thickness, and v is Poisson's ratio. The holding capacity of the gripping device is governed by the energy ratio, which can be expressed according to equation (8) below.

$$\frac{U_b^s}{U_b^s + U_b^h} = \frac{1}{1 + U_h/U_s} = \frac{1}{1 + \lambda_g(\theta/d_y)} = \frac{1/l_c}{1/l_c + \frac{1}{1/\lambda_g} \frac{\theta}{d_y}} \qquad \text{Equation 8}$$

In equation (8), the grasping characteristic length ($\lambda_g$) can be expressed according to equation (9) below.

$$\lambda_g \equiv 4(1+v)\frac{l_x \sin \kappa_0 L_e}{(l_y - t_c)\kappa_0} \qquad \text{Equation (9)}$$

Referring to FIG. 12A, the non-dimensionalized grasping characteristic length ($l_c/\lambda_g$) is plotted in three-dimensions as a function of the two-dimensional geometric parameters ($l_c/l_y$, and $l_c/l_x$) and natural curvature. Referring to FIG. 12B, the geometric parameters $l_c/l_y$ and $l_c/\lambda_g$ of the gripping device are shown versus $l_c/l_x$. Referring to FIG. 12C, the holding force $F_{holding}$ of the griping device is plotted versus the non-dimensionalized grasping characteristic length ($l_c/\lambda_g$). As shown, there is a correlation between the non-dimensionalized grasping characteristic length ($l_c/\lambda_g$) and the load carrying capacity of the gripping device. Thus, the grasping characteristic length can be selected to optimize the holding capacity of the gripping device.

Referring to FIG. 12D, the pinching force of three gripping devices having different grasping characteristic length ($l_c/\lambda_g$) (in this example, 0.78, 0.69, and 0.44) are plotted versus the actuation force.

Referring to FIG. 13, a gripping device 400 according to some implementations of the present disclosure is illustrated. The gripping device 400 is similar to the gripping device 300 (FIG. 3) described above in that the gripping device 400 includes a pattern of slots 420A-420F, a plurality of hinge portions 430A-430G, and a pair of opposing jaw portions 440A-440B. The gripping device 400 also includes a pair of opposing actuation tabs that are the same as, or similar to, the pair of opposing actuation tabs 310A-310B (FIG. 3) described above.

The pattern of slots 420A-420F of the gripping device 400 differs from the pattern of slots 320A-320D described above in that the pattern of slots 420A-420F includes six slots: a first slot 420A, a second slot 420B, a third slot 420C, a fourth slot 420D, a fifth slot 420E, and a fifth slot 420F. The first slot 420A, the second slot 420B, the third slot 420C, and the fourth slot 420D are the same as, or similar to, the first slot 320A, the second slot 320B, the third slot 320C, and the fourth slot 320D (FIG. 3) described above. The fifth slot 420E and the sixth slot 420F are generally aligned with the third slot 420C and the fourth slot 420D along an x-axis or transverse axis of the gripping device 400. The fifth slot 420E and the sixth slot 420F can have the same length as the slots 420A-420D, or a different (e.g., smaller) length than the slots 420A-420D.

The plurality of hinge portions 430A-430G are the same as, or similar to, the plurality of hinge portions 330A-330G (FIG. 3) described above and includes a first hinge portion 430A, a second hinge portion 430B, a third hinge portion 430C, a fourth hinge portion 430D, a fifth hinge portion 430E, a sixth hinge portion 430F, and a seventh hinge portion 430G.

The pair of opposing jaw portions 440A-440B are similar to the pair of opposing jaw portions 340A-340B (FIG. 3) described above in that the pair of opposing jaw portions 440A-440B includes a plurality of parallelogram portions 442A-442D and a plurality of end portions 444A-444D. The pair of opposing jaw portions 440A-440B differs from the pair of opposing jaw portions 340A-340B (FIG. 3) described above in that the pair of opposing jaw portions 440A-440B includes a first protuberance portion 446A and a second protuberance portion 446B. The first protuberance portion 446A and the second protuberance portion 446B have a generally u-shape and aid the gripping device 400 in grasping objects (e.g., a grain of sand, a pill, etc.).

The first protuberance portion 446A generally extends from the first end portion 444A and the second end portion 444B of the first jaw portion 440A. More specifically, the first protuberance portion 446A is generally positioned between the first end portion 444A, the second end portion 444B, the fifth hinge portion 430E, and the outer perimeter 401 of the gripping device 400. As shown, the fifth slot 420E is generally positioned within the first protuberance portion 446A.

The second protuberance portion 446B generally extends from the third end portion 444C and the fourth end portion 444D of the second jaw portion 440B. More specifically, the second protuberance portion 446B is generally positioned between the third end portion 444C, the fourth end portion 444D, the sixth hinge portion 430F, and the outer perimeter 401 of the gripping device 400. As shown, the sixth slot 420F is generally positioned within the second protuberance portion 446B.

Referring to FIG. 14, a gripping device 500 according to some implementations of the present disclosure is illustrated. The gripping device 500 is similar to the gripping device 300 (FIG. 3) described above in that the gripping device 500 includes a pattern of slots 520A-520F, a plurality of hinge portions 530A-530G, and a pair of opposing jaw portions 540A-540B. The gripping device 500 also includes a pair of opposing actuation tabs that are the same as, or similar to, the pair of opposing actuation tabs 310A-310B (FIG. 3) described above.

The pattern of slots 520A-520F of the gripping device 500 differs from the pattern of slots 320A-320D described above in that the pattern of slots 520A-520F includes six slots: a first slot 520A, a second slot 520B, a third slot 520C, a fourth slot 520D, a fifth slot 520E, and a fifth slot 520F. The first slot 520A and the second slot 520B differ from the first slot 320A and the second slot 320B (FIG. 3) described above in that the first slot 520A and the second slot 520B have a generally trapezoidal shape (e.g., as opposed to a general rectangular shape).

The third slot 520C, the fourth slot 520D, the fifth slot 520E, and the sixth slot 520F include generally circular end portions. Specifically, the third slot 520C includes a first end portion 522A and a second opposing end portion 522B, the fourth slot 520D includes a first end portion 524A and a second opposing end portion 524B, the fifth slot 520E includes a first end portion 526A and a second opposing end portion 526B, and the sixth slot 520F includes a first end portion 528A and a second opposing end portion 528B. The generally circular end portions act as a stress reliever by shifting stress concentrations at or near the ends of the slots 520C-520F. Because the circular end portions shift the stress concentrations, the ratio of the longitudinal spacing $l_y$ and the characteristic length $L_e$ of the slots ($l_y/L_e$) can be less than about 0.75.

The plurality of hinge portions 530A-530G are the same as, or similar to, the plurality of hinge portions 330A-330G (FIG. 3) described above and includes a first hinge portion 530A, a second hinge portion 530B, a third hinge portion 530C, a fourth hinge portion 530D, a fifth hinge portion 530E, a sixth hinge portion 530F, and a seventh hinge portion 530G.

The pair of opposing jaw portions 540A-540B are similar to the pair of opposing jaw portions 340A-340B (FIG. 3) described above in that the pair of opposing jaw portions 540A-540B includes a plurality of parallelogram portions 542A-542D and a plurality of end portions 544A-544D. The pair of opposing jaw portions 540A-540B differs from the pair of opposing jaw portions 340A-340B (FIG. 3) described above in that the pair of opposing jaw portions 540A-540B includes a first protuberance portion 546A and a second protuberance portion 546B. The first protuberance portion 546A and the second protuberance portion 546B have a generally circular shape and aid the gripping device 500 in grasping objects (e.g., a grain of sand, a pill, etc.).

The first protuberance portion 546A generally extends from the first end portion 544A and the second end portion 544B of the first jaw portion 540A. More specifically, the first protuberance portion 546A is generally positioned between the first end portion 544A, the second end portion 544B, the fifth hinge portion 530E, and the outer perimeter 501 of the gripping device 500. As shown, the fifth slot 520E is generally positioned within the first protuberance portion 546A.

The second protuberance portion 546B generally extends from the third end portion 444C and the fourth end portion 544D of the second jaw portion 540B. More specifically, the second protuberance portion 544B is generally positioned between the third end portion 544C, the fourth end portion 544D, the sixth hinge portion 530F, and the outer perimeter 501 of the gripping device 500. As shown, the sixth slot 520F is generally positioned within the second protuberance portion 546B.

In some implementations, the gripping devices described herein (e.g., the gripping device 300, the gripping device 400, or the gripping device 500) can be positioned in series and/or in parallel with other gripping devices to form an array of gripping devices.

Referring generally to FIGS. 15A-15C, a system 600 includes a plurality of gripping devices coupled together in series and in parallel to grasp a plurality of objects. The system 600 can be used to approach a plurality of objects, grasp the plurality of objects from a first location, relocate the plurality of objects to a second location, and release plurality of objects at the second location. Thus, the system 600 can grasp multiple target objects in one grasping operation.

Referring to FIG. 15A, a first row 601 includes a plurality of gripping devices 610A-610H. A first gripping device 610A at a first end of the first row 601 is the same as, or similar to, the gripping device 300 (FIG. 3) described above and includes a pattern of slots 620A-620D, a plurality of hinge portions 630A-630C, and a pair of opposing jaw portions 640A-640B. A second gripping device 610B is coupled to the first gripping device 610A at a first hinge portion 630A and a second hinge portion 630B. The fourth slot 612D of the first gripping device 610A is positioned between the first hinge portion 630A and the second hinge portion 630B and is also part of the pattern of slots in the second gripping device 610B. Each of the gripping devices 610B-610G include a pattern of slots, a plurality of hinge portions, and a pair of opposing jaw portions that are the same as, or similar to, the pattern of slots 620A-620D, a plurality of hinge portions 630A-630C, and a pair of opposing jaw portions 640A-640B, respectively.

While the first row 601 is shown as including 8 gripping devices, more generally, the first row 601 can include any suitable number of gripping devices (e.g., 2 gripping devices, 3 gripping devices, 5 gripping devices, 20 gripping devices, etc.).

Referring to FIG. 15B, the first row 601 of gripping devices is connected in parallel to additional rows of gripping devices that are the same as, or similar to, the first row 601 via a first end bracket 650A and a second end bracket 650B to form an array of gripping devices. In the configuration shown in FIG. 15B, each of the gripping devices in the array are in a first generally open position that is the same as, or similar to, the first general open position (FIGS. 4A-4C) of the gripping device 300 described above.

The first end bracket 650A and the second end bracket 650B are coupled to a first arm 660A and a second arm 660B, respectively. Thus, movement of the first end bracket 650A in the direction of arrow A causes corresponding movement of the first end bracket 650A in the direction of arrow A, and movement of the second end bracket 650B in the direction of arrow B causes corresponding movement of the second end bracket 650B in the direction of arrow B. A robotic arm can be used to move the first arm 660A and/or the second arm 660B.

Referring to FIG. 15C, the gripping devices in the array are shown in a second generally closed position that is the same as, or similar to, the second general closed position (FIGS. 6A-6C) of the gripping device 300 described above. More specifically, movement of the first arm 660A in the direction of arrow A and/or movement of the second arm 660B in the direction of arrow B causes the gripping devices in the array to move from the first generally open position (FIG. 15B) to the second generally closed position (FIG. 15C) to grip one or more objects.

While the system 600 is shown as including three rows of gripping devices, more generally, the system 600 can include any suitable number of rows of gripping devices (e.g., 2 rows, 5 rows, 10 rows, 20 rows, etc.).

One or more elements or aspects or steps, or any portion(s) thereof, from one or more of any of claims 1-43 below can be combined with one or more elements or aspects or steps, or any portion(s) thereof, from one or more of any of the other claims 1-43 or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A device comprising:
   a plurality of slots arranged in a pattern, the plurality of slots including a first slot, a second slot, a third slot, and a fourth slot;
   a plurality of hinge portions;
   a pair of opposing jaw portions; and
   a pair of opposing actuation tabs configured to move in generally opposite directions from a first position towards a second position in response to an input to aid in causing the pair of opposing jaw portions to grip an object, a first one of the pair of opposing actuation tabs being coupled to a first one of the opposing jaw portions at a first one of the plurality of hinge portions and a second one of the opposing jaw portions at a second one of the plurality of hinge portions, and a second one of the pair of opposing actuation tabs being coupled to the first one of the opposing jaw portions at a third one of the plurality of hinge portions and the second one of the opposing jaw portions at a fourth one of the plurality of hinge portions, and the first hinge portion being positioned between an outer perimeter of the device and a first end of the first slot, the second hinge portion being positioned between the outer perimeter of the device and a second opposing end of the first slot, the third hinge portion being positioned between the outer perimeter of the device and a first end of the second slot, and the fourth hinge portion being positioned between the outer perimeter of the device and a second opposing end of the second slot.

2. The device of claim 1, wherein the first one of the opposing jaw portions includes a first parallelogram portion, a second parallelogram portion, a first end portion, and a second end portion.

3. The device of claim 2, wherein a fifth one of the plurality of hinge portions is positioned between the first end portion, the second end portion, a first end of the third slot, and the outer perimeter of the device.

4. The device of claim 3, wherein the second one of the opposing jaw portions includes a third parallelogram portion, a fourth parallelogram portion, a third end portion, and a fourth end portion.

5. The device of claim 4, wherein a sixth one of the plurality of hinge portions is positioned between the third end portion, the fourth end portion, a second end of the fourth slot, and the outer perimeter of the device.

6. The device of claim 5, wherein a seventh one of the plurality of hinge portions is positioned between the first parallelogram portion and the third parallelogram portion, between the second end of the third slot and the first end of the fourth slot, and between the second parallelogram portion and the fourth parallelogram portion.

7. The device of claim 1, wherein the device is biased with a natural curvature.

8. The device of claim 1, wherein the device has an initial curvature in response to the pair of opposing actuation tabs being in the first position and a modified curvature in response to the pair of opposing actuation tabs moving towards the second position, wherein the modified curvature is greater than the initial curvature.

9. The device of claim 1, wherein each of the plurality of slots has an initial shape in response to the pair of opposing actuation tabs being in the first position and a modified shape in response to the pair of opposing actuation tabs moving towards the second position.

10. The device of claim 1, wherein a portion of a first one of the pair of opposing jaw portions is configured to contact a portion of a second one of the pair of opposing jaw portions in response to the pair of opposing jaw portions being in the second position.

11. The device of claim 1, wherein a first portion of the perimeter of the device adjacent to a first one of the pair of opposing jaw portions and a second opposing portion of the perimeter of the device adjacent to a second one of the pair of opposing jaw portions both have a generally curved shape to aid in gripping the object.

12. The device of claim 1, wherein the pair of opposing jaw portions and the pair of opposing actuation tabs are made from a first material and at least one of the plurality of hinge portions is made from a second material that is different than the first material.

13. The device of claim 1, wherein the input is a mechanical input via a mechanism that is directly coupled to the pair of opposing actuation tabs.

14. A device comprising:
    a plurality of slots arranged in a pattern, the plurality of slots including a first slot, a second slot, a third slot, and a fourth slot, the third slot having a first end portion, a middle portion, and a second end portion and the fourth slot having a first end portion, a middle portion, and a second end portion;
    a plurality of hinge portions;
    a pair of opposing jaw portions; and
    a pair of opposing actuation tabs configured to move in generally opposite directions from a first position towards a second position in response to an input to aid in causing the pair of opposing jaw portions to grip an object, the second end portion of the third slot being generally circular and the middle portion of the third slot being generally rectangular.

15. The device of claim 14, wherein the plurality of hinge portions includes a main hinge portion positioned between the third slot and the fourth slot, the second end portion of the third slot having a width that is greater than a width of the middle portion of the third slot to aid in reducing stress in the main hinge portion caused by the pair of opposing actuation tabs moving towards the second position.

16. The device of claim 14, wherein the device is biased with a natural curvature.

17. The device of claim 14, wherein the device has an initial curvature in response to the pair of opposing actuation tabs being in the first position and a modified curvature in response to the pair of opposing actuation tabs moving towards the second position, wherein the modified curvature is greater than the initial curvature.

18. The device of claim 14, wherein each of the plurality of slots has an initial shape in response to the pair of opposing actuation tabs being in the first position and a modified shape in response to the pair of opposing actuation tabs moving towards the second position.

19. The device of claim 14, wherein a portion of a first one of the pair of opposing jaw portions is configured to contact a portion of a second one of the pair of opposing jaw portions in response to the pair of opposing jaw portions being in the second position.

20. The device of claim 14, wherein a first portion of the perimeter of the device adjacent to a first one of the pair of opposing jaw portions and a second opposing portion of the perimeter of the device adjacent to a second one of the pair of opposing jaw portions both have a generally curved shape to aid in gripping the object.

21. The device of claim 14, wherein the pair of opposing jaw portions and the pair of opposing actuation tabs are made from a first material and at least one of the plurality of hinge portions is made from a second material that is different than the first material.

22. The device of claim 14, wherein the input is a mechanical input via a mechanism that is directly coupled to the pair of opposing actuation tabs.

23. A device comprising:
a plurality of slots arranged in a pattern, the plurality of slots including a first slot, a second slot, a third slot, and a fourth slot, each of the plurality of slots having a predetermined length, the third slot and the fourth slot being aligned along a transverse axis of the device and an inner end of the third slot being spaced from an inner end of the fourth slot by a transverse spacing;
a plurality of hinge portions;
a pair of opposing jaw portions; and
a pair of opposing actuation tabs configured to move in generally opposite directions from a first position towards a second position in response to an input to aid in causing the pair of opposing jaw portions to grip an object.

24. The device of claim 23, wherein the first slot is spaced from the third slot and the fourth slot by a longitudinal spacing and the second slot is spaced from the third slot and the fourth slot by the longitudinal spacing, and each of the plurality of slots has a characteristic length that is a function of the predetermined length, the transverse spacing, and the longitudinal spacing.

25. The device of claim 24, wherein a ratio of the longitudinal spacing and the transverse spacing of the plurality of slots is greater than 1 and a ratio of the longitudinal spacing to the characteristic length of the plurality of slots is greater than 0.75.

26. The device of claim 23, wherein the device is biased with a natural curvature.

27. The device of claim 23, wherein the device has an initial curvature in response to the pair of opposing actuation tabs being in the first position and a modified curvature in response to the pair of opposing actuation tabs moving towards the second position, wherein the modified curvature is greater than the initial curvature.

28. The device of claim 23, wherein each of the plurality of slots has an initial shape in response to the pair of opposing actuation tabs being in the first position and a modified shape in response to the pair of opposing actuation tabs moving towards the second position.

29. The device of claim 23, wherein a portion of a first one of the pair of opposing jaw portions is configured to contact a portion of a second one of the pair of opposing jaw portions in response to the pair of opposing jaw portions being in the second position.

30. The device of claim 23, wherein a first portion of the perimeter of the device adjacent to a first one of the pair of opposing jaw portions and a second opposing portion of the perimeter of the device adjacent to a second one of the pair of opposing jaw portions both have a generally curved shape to aid in gripping the object.

31. The device of claim 23, wherein the pair of opposing jaw portions and the pair of opposing actuation tabs are made from a first material and at least one of the plurality of hinge portions is made from a second material that is different than the first material.

32. The device of claim 23, wherein the input is a mechanical input via a mechanism that is directly coupled to the pair of opposing actuation tabs.

33. A device comprising:
a plurality of slots arranged in a pattern;
a plurality of hinge portions;
a pair of opposing jaw portions; and
a pair of opposing actuation tabs configured to move in generally opposite directions from a first position towards a second position in response to an input to aid in causing the pair of opposing jaw portions to grip an object, the input being a magnetic input.

34. The device of claim 33, further comprising a first magnetic element coupled to a first one of the pair of opposing actuation tabs and a second magnetic element coupled to a second one of the pair of opposing actuation tabs.

35. The device of claim 34, wherein application of a magnetic field on the first magnetic element, the second magnetic element, or both, is configured to cause the pair of opposing jaw portions to move from the first position to the second position.

36. The device of claim 35, wherein the moving of the pair of opposing jaw portions occurs in less than about 150 ms.

37. The device of claim 33, wherein the device is biased with a natural curvature.

38. The device of claim 33, wherein the device has an initial curvature in response to the pair of opposing actuation tabs being in the first position and a modified curvature in response to the pair of opposing actuation tabs moving towards the second position, wherein the modified curvature is greater than the initial curvature.

39. The device of claim 33, wherein each of the plurality of slots has an initial shape in response to the pair of opposing actuation tabs being in the first position and a modified shape in response to the pair of opposing actuation tabs moving towards the second position.

40. The device of claim 33, wherein a portion of a first one of the pair of opposing jaw portions is configured to contact a portion of a second one of the pair of opposing jaw portions in response to the pair of opposing jaw portions being in the second position.

41. The device of claim 33, wherein a first portion of the perimeter of the device adjacent to a first one of the pair of opposing jaw portions and a second opposing portion of the perimeter of the device adjacent to a second one of the pair of opposing jaw portions both have a generally curved shape to aid in gripping the object.

42. The device of claim 33, wherein the pair of opposing jaw portions and the pair of opposing actuation tabs are made from a first material and at least one of the plurality of hinge portions is made from a second material that is different than the first material.

43. The device of claim 33, wherein the input is a mechanical input via a mechanism that is directly coupled to the pair of opposing actuation tabs.

44. A device comprising:
a plurality of slots arranged in a pattern;
a plurality of hinge portions;
a first pair of opposing jaw portions;
a second pair of opposing jaw portions; and
a pair of opposing actuation tabs configured to move in generally opposite directions from a first position towards a second position in response to an input, the first pair opposing jaw portions and the second pair of opposing jaw portions being positioned between a first one of the pair of opposing actuation tabs and a second one of the pair of opposing actuation tabs such that moving the pair of opposing actuation tabs from the first position towards the second position responsive to the input aids in causing the first pair of opposing jaws to grip a first object and the second pair of opposing jaws to grip a second object.

45. The device of claim 44, wherein the first pair of opposing jaw portions and the second pair of opposing jaw portions are coupled together in series.

46. The device of claim 44, wherein the first pair of opposing jaw portions and the second pair of opposing jaw portions are coupled together in parallel.

47. The device of claim 44, wherein the device is biased with a natural curvature.

48. The device of claim 44, wherein the device has an initial curvature in response to the pair of opposing actuation tabs being in the first position and a modified curvature in response to the pair of opposing actuation tabs moving towards the second position, wherein the modified curvature is greater than the initial curvature.

49. The device of claim 44, wherein each of the plurality of slots has an initial shape in response to the pair of opposing actuation tabs being in the first position and a modified shape in response to the pair of opposing actuation tabs moving towards the second position.

50. The device of claim 44, wherein a portion of a first one of the first pair of opposing jaw portions is configured to contact a portion of a second one of the first pair of opposing jaw portions in response to the first pair of opposing jaw portions being in the second position and wherein a portion of a first one of the second pair of opposing jaw portions is configured to contact a portion of a second one of the second pair of opposing jaw portions in response to the second pair of opposing jaw portions being in the second position.

51. The device of claim 44, wherein a first portion of the perimeter of the device adjacent to a first one of the first pair of opposing jaw portions and a second opposing portion of the perimeter of the device adjacent to a second one of the first pair of opposing jaw portions both have a generally curved shape to aid in gripping the first object and wherein a third portion of the perimeter of the device adjacent to a first one of the second pair of opposing jaw portions and a fourth opposing portion of the perimeter of the device adjacent to a second one of the second pair of opposing jaw portions both have a generally curved shape to aid in gripping the second object.

52. The device of claim 44, wherein the first pair of opposing jaw portions, the second pair of opposing jaw portions, and the pair of opposing actuation tabs are made from a first material and at least one of the plurality of hinge portions is made from a second material that is different than the first material.

53. The device of claim 44, wherein the input is a mechanical input via a mechanism that is directly coupled to the pair of opposing actuation tabs.

\* \* \* \* \*